United States Patent [19]
Akamatsu et al.

[11] Patent Number: 6,118,948
[45] Date of Patent: Sep. 12, 2000

[54] FOCUS DETECTOR

[75] Inventors: Norihiko Akamatsu, Suita; Hiroshi Ueda, Habikino, both of Japan

[73] Assignee: Minolta Co., Ltd., Osaka, Japan

[21] Appl. No.: 09/391,398

[22] Filed: Sep. 8, 1999

Related U.S. Application Data

[62] Division of application No. 09/144,974, Sep. 1, 1998, Pat. No. 5,974,271.

[30] Foreign Application Priority Data

| Sep. 2, 1997 | [JP] | Japan | 9-237526 |
| Sep. 2, 1997 | [JP] | Japan | 9-237527 |
| Sep. 2, 1997 | [JP] | Japan | 9-237528 |

[51] Int. Cl.$^7$ .................................................. G03B 13/36
[52] U.S. Cl. ............................................ 396/104; 396/123
[58] Field of Search .................................. 396/104, 121, 396/122, 123; 250/201.8

[56] References Cited

U.S. PATENT DOCUMENTS

| 4,636,624 | 1/1987 | Ishida et al. | 250/201.8 |
| 4,835,615 | 5/1989 | Taniguchi et al. | 348/297 |
| 4,859,842 | 8/1989 | Suda et al. | 250/201.8 |
| 5,333,028 | 7/1994 | Akashi et al. | 396/104 |

FOREIGN PATENT DOCUMENTS

| 6-201987 | 7/1994 | Japan. |

*Primary Examiner*—W. B. Perkey
*Attorney, Agent, or Firm*—Burns, Doane, Swecker & Mathis, LLP

[57] ABSTRACT

A focus detector amplifies a plurality of sets of output signals from a plurality of photoelectric transfer element arrays by the most preferable amplifying mode and focuses a focus of an optical lens system on a desired object among a plurality of objects corresponding to the photoelectric transfer element arrays by selecting a method for deciding a defocus among a nearest position priority method, a lateral direction priority method and a reliability priority method responding to a condition of the objects.

9 Claims, 17 Drawing Sheets

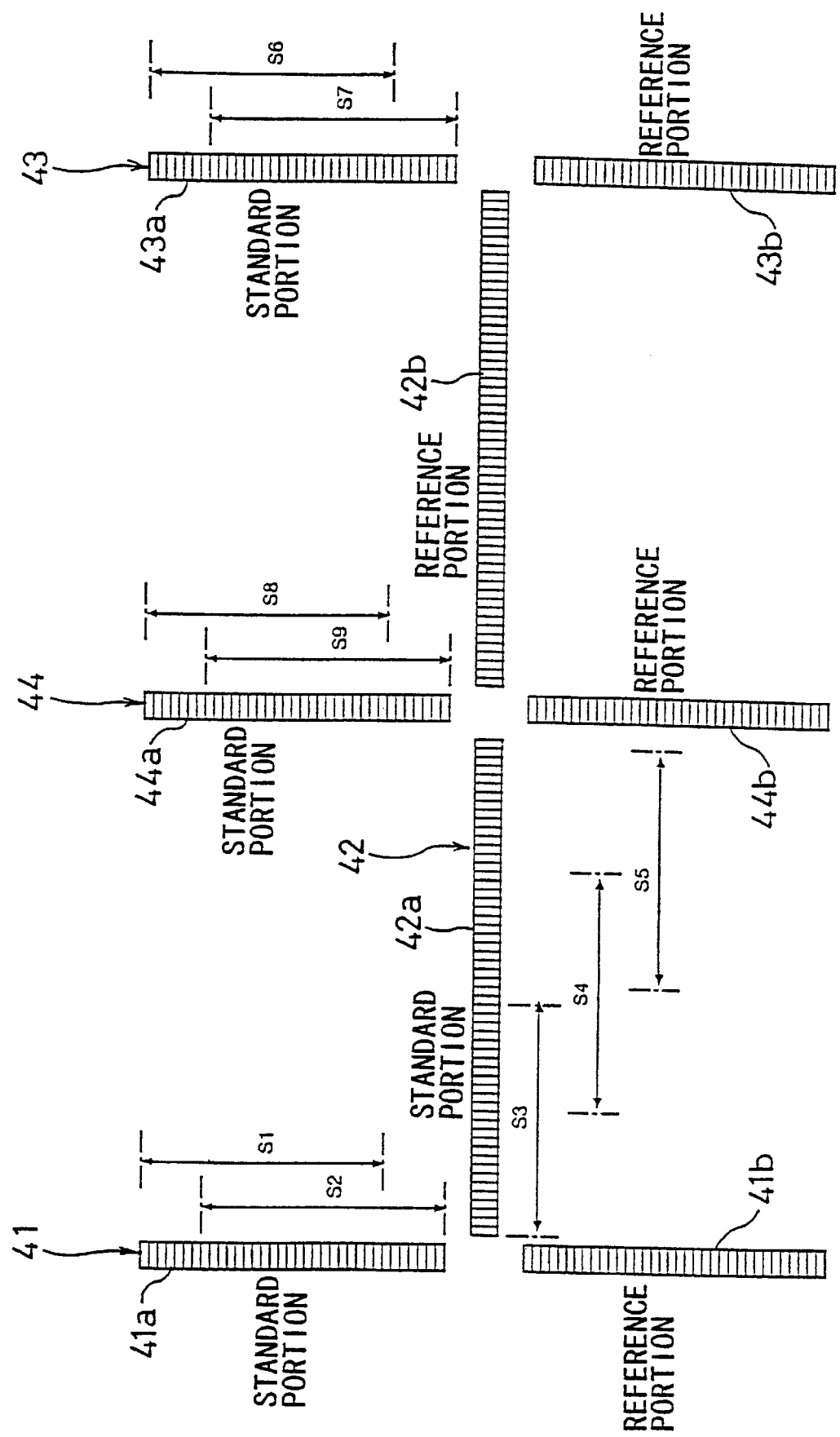

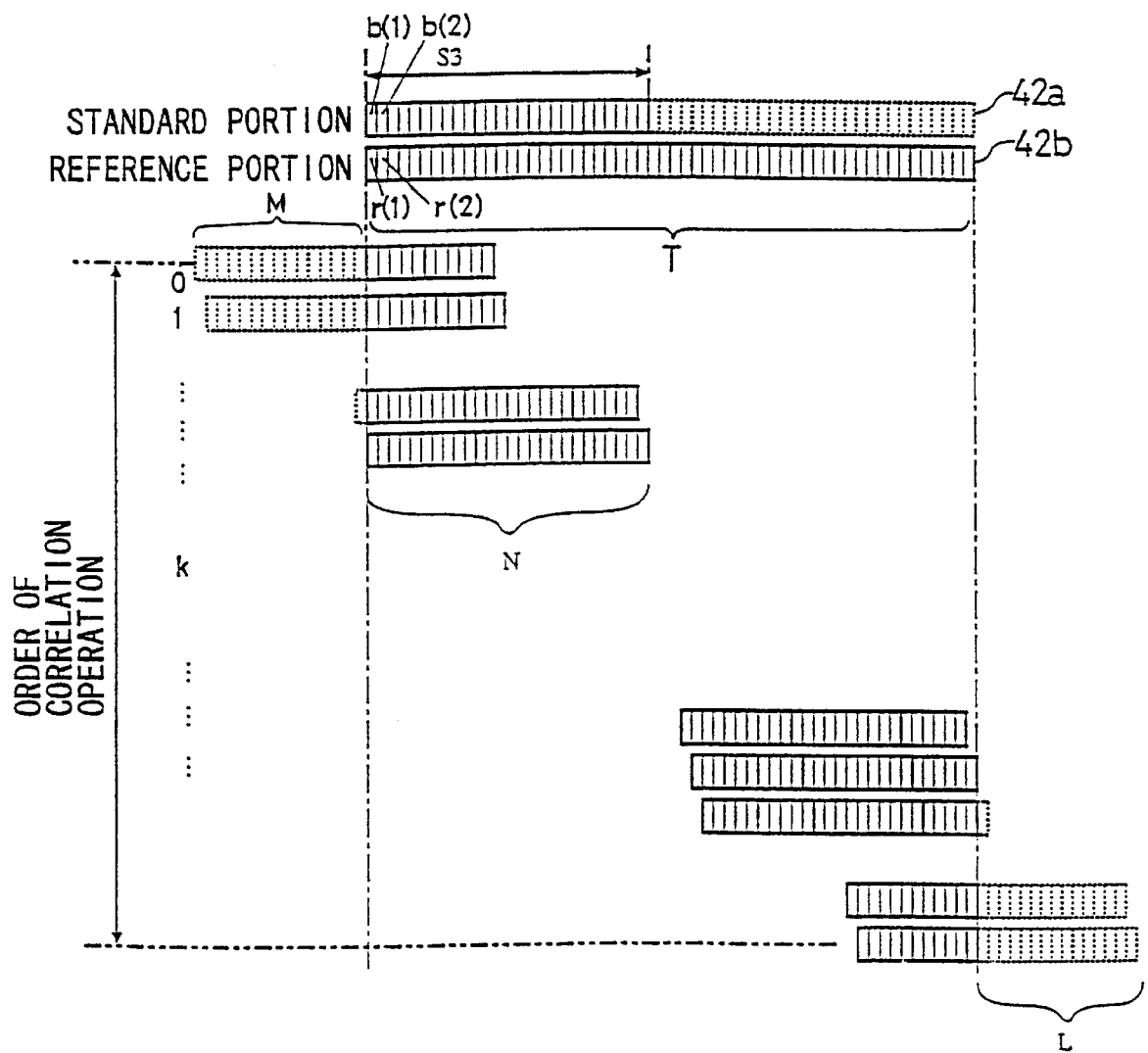

FOCUS DETECTOR

This application is a divisional of application Ser. No. 09/144,974, filed Sep. 1, 1998, now U.S. Pat. No. 5,974,271.

This application is based on patent applications No.9-237526, No.9-237527 and No.9-237528 filed in Japan, the contents of which are hereby incorporated by references.

BACKGROUND OF THE INVENTION

1. Field of the Invention

This invention relates to a phase differential type focus detector used in an optical equipment such as an automatic focusing type single lens reflex camera (hereinafter, abbreviated as AF-SLR camera), and especially relates to a focus detector having at least two photoelectric transfer element arrays.

2. Description of the Prior Art

Generally, when a contrast value of an object is lower, it is difficult to detect a focus of an optical lens system by a phase differential type focus detector. In a conventional phase differential type focus detector, output signals from a photoelectric transfer element array are amplified with respect to a dark output voltage thereof (hereinafter, this amplifying mode is abbreviated as NM mode). Alternatively, output signals of a photoelectric transfer element array are amplified with respect to an average voltage of the output signals (hereinafter, this amplifying mode is abbreviated as LC mode). The LC mode is effective when the contrast value of the object is lower but the luminance thereof is higher. In the optical equipment having only one photoelectric transfer element array such as an AF-SLR camera in the initial stage, one of the above-mentioned NM mode and LC mode is selected for amplifying the output signals of the photoelectric transfer element array corresponding to level of the luminance of the object.

In recent years, it is proposed that a plurality of photoelectric transfer element arrays are respectively provided in different focusing areas so as to focusing an optical lens system on an object, for example, positioned distant from the center of a frame of a viewfinder of the camera. In such an equipment, there is a possibility that a first object having lower contrast value and a second object having a higher contrast value are respectively positioned on different focusing areas. Hereupon, when all the output signals of the photoelectric transfer element arrays are amplified by the above-mentioned NM mode, voltage of amplified signals with respect to the object having higher contrast value becomes too high to be treated in a CPU (Central Processing Unit). Alternatively, when all the output signals of the photoelectric transfer element arrays are amplified by the above-mentioned LC mode, variation of amplified signals with respect to the object having lower contrast value is too small detect the focus of the optical lens system.

In the phase differential type focus detector, each photoelectric transfer element array has a standard portion and a reference portion respectively configured by a plurality of pixels. The output signals are series of voltage signals from the pixels. There are many cases to call the output signals as data of pixels in the following explanation. The output signals of the standard portion are compared with the output signals of the of the reference portion for detecting a position where a pattern of the output signals of the standard portion is coincide with a pattern of the output signals of the reference portion. That is, the position shows the focus of the optical lens system.

In an equipment using the phase differential type focus detector, a plurality of objects disposed at different positions or a plurality of different portions of the same object having substantially the same pattern of contrast are rarely focused on different portions of the same photoelectric transfer element array. When data of pixels of the standard portion corresponding to a predetermined object or a predetermined portion of the object are compared with data of pixels of the reference portion corresponding to a different object or a different portion of the object having substantially the same pattern of contrast, the data of pixels of the standard portion is misjudged to coincide with the data of pixels of the reference portion. For preventing such misjudgment, the data of pixels of the standard portion are divided into a plurality of blocks in a manner so that a part of each block overlaps another block. The data of pixels in each block of the standard portion are compared with all the data of pixels of the reference portion.

A configuration of the photoelectric transfer element array having the standard portion and the reference portion and a method for comparing the data of pixels in the conventional phase differential type focus detector is described with reference to FIG. 17. The standard portion 51 and the reference portion 52 of the photoelectric transfer element array are actually disposed on the same line. However, the standard portion 51 and the reference portion 52 are disposed in parallel with each other in FIG. 17 so as to make the explanation of the comparison of the standard portion 51 with the reference portion 52 easy.

When the data of pixels of a block S3 disposed left hand in the standard portion 51 are compared with all the data of pixels of the reference portion 52, the data of pixels of the block S3 is shifted one by one from the left hand to the right hand in the figure for correlation operation. As can be seen from FIG. 17, the number of pixels of the reference portion 52 is larger than that of the standard portion 51.

The data of pixel of the block S3 are designated by b(j) (j=1 to N). The data of pixels of the reference portion 52 are designated by r(j) (j=1 to T). A number of pixels which are to be shifted (order of correlation operation) is designated by k (k=0 to (T−N)). A discordance quantity Hn(k) shown by the following equation can be used as a value for showing a $$Hn(k) = \sum_{j=1}^{N} |b(j) - r(k+j)|$$

degree of coincidence of the correlation operation. Generally, the higher the decree of coincidence of the correlation operation is, the smaller the discordance quantity Hn(k) is.

The phase differential type focus detector, however, is incorporated in a highly integrated equipment such as an AF-SLR camera. Since size of the focus detector is restricted, the number of pixels of the photoelectric transfer element array (including the standard portion and the reference portion) can not be made so large. When the data of pixels of the block S3 disposed in the vicinity of left end of the standard portion 51 are compared with all the data of pixels of the reference portion 52, the reference portion 52 has sufficient number of pixels to be compared in the right hand in the figure, but it has a few pixels to be compared in the left hand in the figure. Similarly, when data of pixels of a block (not shown in the figure) disposed in the vicinity of the right end of the standard portion 51 are compared with all the data of pixels of the reference portion 52, the reference portion 52 has sufficient number of pixels to be compared in the left hand in the figure, but it has a few pixels to be compared in the right hand in the figure.

Hereupon, there is a possibility that the data of pixels in the vicinity of right end of the block S3 in the standard portion 51 coincide with the data of pixels in the vicinity of the left end of the reference portion 52. The conventional focus detector, however, cannot be detected the focus of the optical lens system due to the impossibility of the data comparing in spite of the possibility of the focus detection.

Furthermore, in the equipment having a plurality of photoelectric transfer element arrays, it is a problem to select a defocus with respect to the focus detection which is to be used in an operation of the lens driving among a plurality of defocuses obtained from the photoelectric transfer element arrays. A nearest position priority method compares two defocuses and selects the larger one. That is, the nearest position priority method prefers the object positioned near to the equipment. A reliability priority method calculates two contrast values from the data of pixels of the photoelectric transfer element arrays disposed in the lateral direction and the longitudinal direction and selects a defocus of the photoelectric transfer element array showing the higher contrast value. A lateral direction priority method selects the defocus of the photoelectric transfer element arrays disposed in the lateral direction. In the equipment simply adopting the reliability priority method or the lateral direction priority method, when the objects are respectively disposed at positions near to and far from the equipment, the focus of the optical lens system cannot be focused on the desired object.

Generally, performance for focus detection of the focus detector in the lateral direction is not necessarily the same as that in the longitudinal direction due to not only errors in an assembly of the focus detector but also errors in working of the parts. Furthermore, the sensitivity of the photoelectric transfer element arrays are not the same. Especially, when a photoelectric transfer element array is obliquely disposed with respect to an optical axis of an optical lens system, an error with directional dependency occurs with respect to an object disposed in the oblique direction against the photoelectric transfer element array. If the position or direction of the focus detector is adjusted in order to reduce the error of the focus detection in one of the lateral direction and the longitudinal direction, the error of the focus detection in the other direction which is not adjusted would remain or be increased.

In an equipment adopting the nearest position priority method, when the difference of two defocuses obtained from the photoelectric transfer element arrays disposed in the lateral direction and the longitudinal direction are small, far and near of the positions of the objects will be reversed due to the above-mentioned error with directional dependency under certain circumference. Similarly, in an equipment adopting the reliability priority method, a pair of photoelectric transfer element arrays having a larger error cannot be function.

SUMMARY OF THE INVENTION

A focus detector of this invention has a plurality of photoelectric transfer element arrays and amplifies output signals of each photoelectric transfer element array by the most preferable amplifying mode.

Another focus detector of this invention has at least a photoelectric transfer element array constituted by a standard portion and a reference portion, in which data of pixels of blocks respectively disposed in the vicinity of both ends of the standard portion can be compared with data of pixels of the reference portion by offsetting a predetermined number of pixels of the blocks respectively disposed in the vicinity of the ends of the standard portion.

Still another focus detector of this invention has a plurality of photoelectric transfer element arrays and focuses a focus of an optical lens system on a desired object among a plurality of objects corresponding to the photoelectric transfer element arrays by selecting a method for deciding a defocus among a nearest position priority method, a lateral direction priority method and a reliability priority method responding to a condition of the objects.

BRIEF DESCRIPTION OF THE DRAWINGS

FIG. 3 is a front view showing an arrangement of photoelectric transfer element arrays on a sensor tip 141 shown in FIG. 2;

FIG. 4 is a drawing showing a correlation operation for a focus detection of an optical lens system by the focus detector of the embodiment of this invention;

FIGS. 12 to 16 are flowcharts showing a focus detection of the optical lens system by the focus detector of the embodiment of this invention; and.

DETAILED DESCRIPTION OF THE PREFERRED EMBODIMENTS OF THE INVENTION

Figure 1:
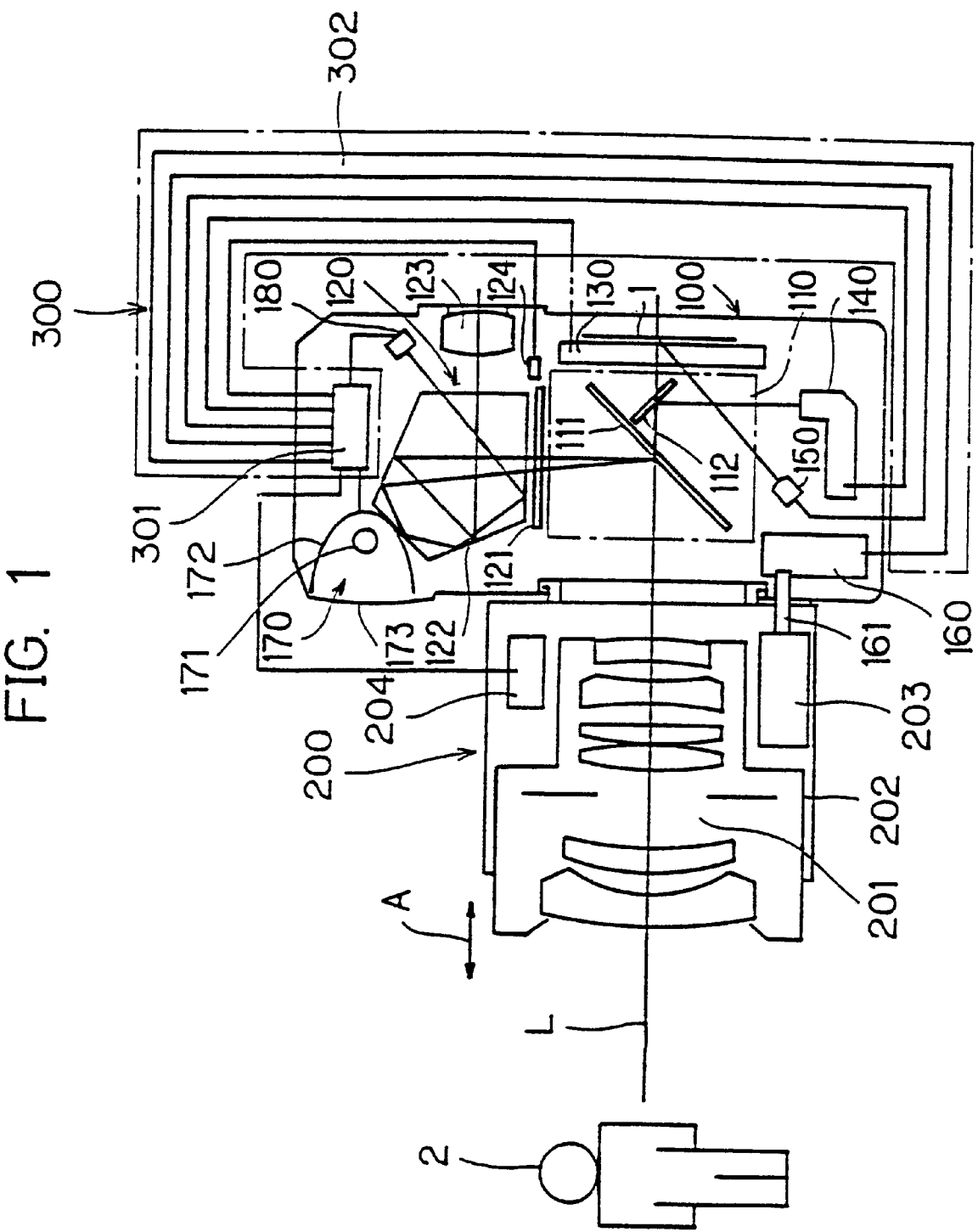
FIG. 1 is a block diagram showing a configuration of an AF-SLR camera which uses a focus detector of an embodiment of this invention.

An embodiment of a phase differential type focus detector of this invention is described with reference to the drawings. FIG. 1 shows a configuration of an AF-SLR camera which is an example of an equipment using the focus detector of an embodiment of this invention.

A mirror unit 110 is provided in the center portion of a camera body 100. The mirror unit 110 comprises a main mirror 111 crossing an optical axis L at angle of 45 degrees and a supplemental mirror 112 provided on and perpendicular to a rear face of the main mirror 111. A viewfinder 120 is provided above the mirror unit 110. The viewfinder 120 comprises a focusing screen 121, a pentagonal prism 122, an eyepiece 123 and a display device 124. A flash unit 170 for lightening a flash light is provided above the viewfinder 120.

A focus detector (automatic focusing sensor module) 140, a first light sensor 150, an AF driving unit 160 and a relay lens 151 are provided below the mirror unit 110. A shutter unit 130 is provided between the mirror unit 110 and the focal plane (or film plane) 1. A flexible printed circuit substrate 300 including an AF-CPU 301 and wiring 302 is provided in an inner space of the camera body 100. The relay lens 151 is not necessarily used as described below.

An interchangeable lens 200 comprises an optical lens system 201, a lens barrel 202 for holding the optical lens system 201, a lens driving mechanism 203 for moving the lens barrel 202 with the optical lens system 201 in a direction parallel to the optical axis L and a lens CPU 204 memorizing a focal length, a n open aperture F-number, an F-number for automatic focusing and minimum F-number of the optical lens system 201 and transferring the data of the interchangeable lens 200 to the AF-CPU 301.

The main mirror 111 reflects most of the light flux passing through the optical lens system 201 to the focusing screen 121 and transmits the remainder. The supplemental mirror 112 reflects the light flux transmitting the main mirror 111 to the focus detector 140. The pentagonal prism 122 turns the right and left of the image on the focusing screen 121 reversely and reflects the image to the eyepiece 123.

A second light sensor 180 is provided in the vicinity of an exit surface of the pentagonal prism 122. The second light sensor 180 includes condenser lenses and photoelectric transfer devices such as photodiode and outputs a signal corresponding to a luminance of an object 2 to the AF-CPU 301. The display device 124 includes light emitting devices such as LED and liquid crystal display device and displays an information of the condition of focusing whether the optical lens system 201 is focused on the object 2 or not, and values of shutter speed and aperture (F-number).

The flash unit 170 includes a charging circuit (not shown in the figure) for charging an electric energy in a capacitor, a luminescent tube such as xenon tube 171 for transferring the electric energy to the light, a reflector 172 for reflecting the flash light from the luminescent tube 171 to the forward of the camera, and a Fresnel lens 173 for diverging or condensing the flash light. The first light sensor 150 includes a condenser lens and a photoelectric transfer device such as photodiode. The first light sensor 150 detects an amount of light reflected from the film surface 1 during the flash lighting by the flash unit 170 and outputs a signal corresponding to the amount of the light. The AF-CPU 301 stops the flash lighting of the flash unit 170 when the amount of the light reaches to a predetermined value based on the signal from the first light sensor 150.

The AF driving unit 160 includes an actuator such as a DC motor, a stepping motor or an ultrasonic motor, an encoder for detecting direction and rotation speed of the actuator and outputting signals corresponding to them and a reduction gear train for reducing the rotation of the actuator. The AF drive unit 160 is engaged with the lens driving mechanism 203 via an output shaft 161. The lens driving mechanism 203 includes a helicoid and a gear train for rotating the helicoid and moves the integration of the optical lens system 201 and the lens barrel 202 in a direction parallel to the optical axis L by the driving force of the actuator of the AF driving unit 160. The direction and moving quantity of the optical lens system 201 and the lens barrel 202 are controlled by the rotation direction and the rotation number of the actuator.

Figure 2:
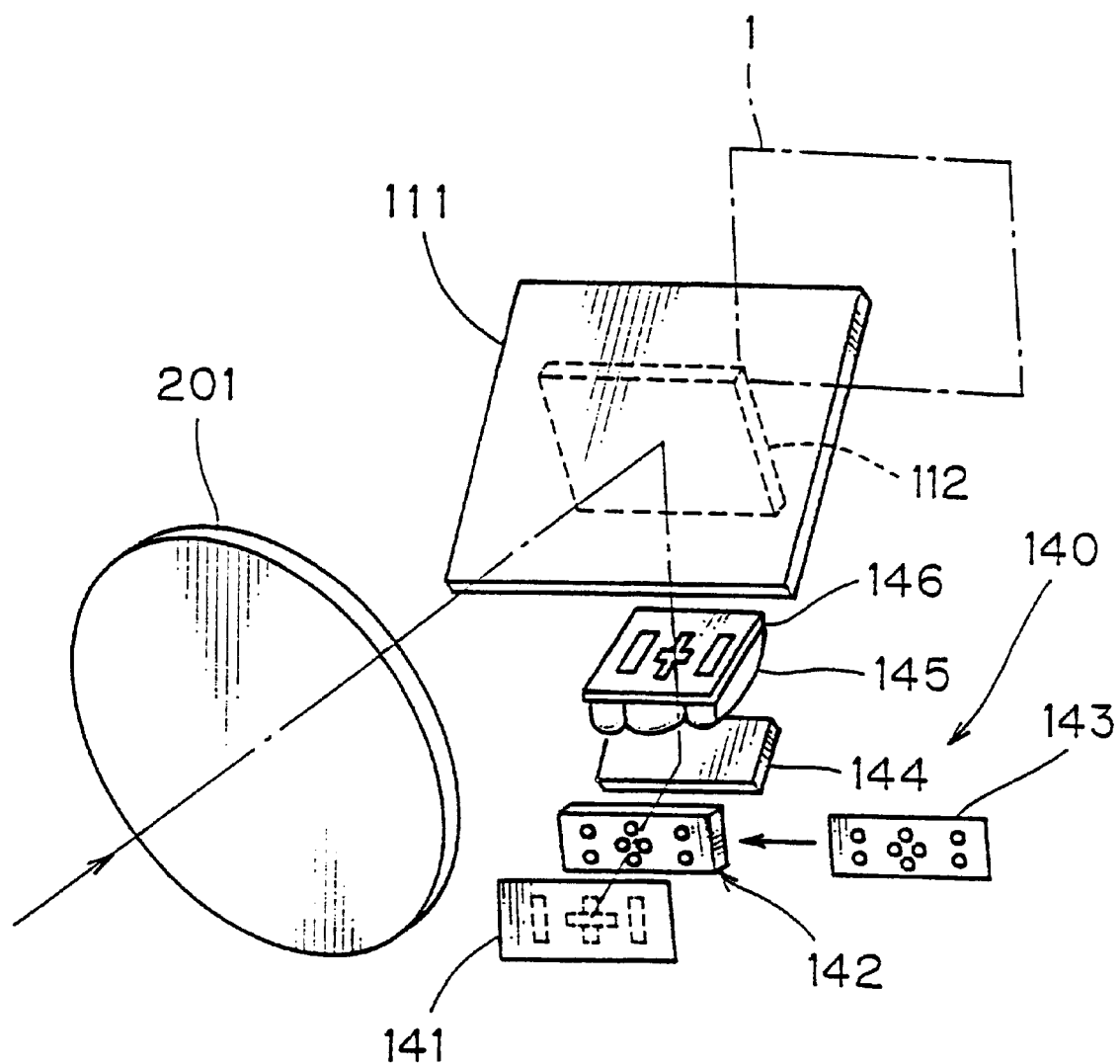
FIG. 2 is a perspective view showing a configuration of an embodiment of the focus detector of the embodiment of this invention.

Details of the focus detector 140 is shown in FIG. 2. The focus detector 140 comprises a sensor tip 141 having four photoelectric transfer element arrays such as CCD (Charge Coupled Device), a separator 142 disposed in front of the sensor 141 and having four sets of reforming lenses corresponding to standard portions and reference portions of the photoelectric transfer element arrays, an aperture mask 143 having four sets of openings corresponding to the reforming lenses, a mirror 144 for reflecting light flux to a predetermined direction, a condenser lens 145 disposed in front of the aperture mask 143 via the mirror 144 and a field mask 146 having a predetermined shaped openings for restricting the incident light flux into the focus detector 140.

An incident plane of the sensor tip 141 is positioned on a focal plane of the reforming lenses of the separator 142. The separator 142 separates the incident light flux into a plurality of light flux and focuses on the photoelectric transfer element arrays. Each opening of the aperture mask 143 has a circular or a rectangular shape and restricts the light flux entering into the reforming lens of the separator 142. The field ma sk 146 is disposed in the vicinity of an equivalent focal plane which is distant substantially the same length as the focal plane 1 from the optical lens system 201 for restricting the incident light flux entering into the focus detector 140. The openings of the field mask 146 corresponds to the arrangement of the photoelectric transfer element arrays. For example, the center opening has a cross shape and the side openings have a rectangular shape.

An arrangement of the photoelectric transfer element arrays on the sensor tip 141 is shown in FIG. 3. In FIG. 3, a first photoelectric transfer element array 41 (hereinafter, it is called first island 41) is longitudinally disposed at left side in the figure. The upper portion configured by a plurality of pixels serves as a standard portion 41*a* of the first island 41. The lower portion configured by a plurality of pixels serves as a reference portion 41*b* of the first island 41. A second photoelectric transfer element array 42 (hereinafter, it is called second island 42) is laterally disposed at the center in the figure. The left portion configured by a plurality of pixels serves as a standard portion 42*a* of the second island 42. The right portion configured by a plurality of pixels serves as a reference portion 42*b* of the second island 42. A third photoelectric transfer element array 43 (hereinafter, it is called third island 43) is longitudinally disposed at right side in the figure. The upper portion configured by a plurality of pixels serves as a standard portion 43*a* of the third island 43. The lower portion configured by a plurality of pixels serves as a reference portion 43*b* of the third island 43. A fourth photoelectric transfer element array 44 (hereinafter, it is called fourth island 44) is longitudinally disposed at the center in the figure. The upper portion configured by a plurality of pixels serves as a standard portion 44*a* of the fourth island 44. The lower portion configured by a plurality of pixels serves as a reference portion 44*b* of the fourth island 44. The first island 41 and the third island 43 respectively correspond to first and third focusing areas. The second island 42 and the fourth island 44 correspond to second cross focusing area disposed at the center of the sensor tip 141. Number of the pixels of the standard portions 41*a*, 43*a* and 44*a* of the first, third and fourth islands 41, 43 and 44 are the same. Similarly, number of pixels of the reference portions 41*b*, 43*b* and 44*b* of the first, third and fourth islands 41, 43 and 44 are the same.

The pixels of standard portions 41*a* to 44*a* of the first to fourth islands 41 to 44 are respectively divided into a plurality of blocks S1 to S9. Data of pixels of the blocks S1 and S2 of the standard portion 41a of the first island 41 are respectively compared with the data of pixels of the reference portion 41b. Similarly, data of pixels of the blocks S3 to S9 of the standard portion 42a to 44a of the second to fourth islands 42 to 44 are respectively compared with the data of pixels of the corresponding reference portions 42b to 44b. As a result, the focus detection of the optical lens system 201 is executed by the first to fourth islands 41 to 44.

Correlation operation for the focus detection of the optical lens system 201 is described with reference to the block S3 of the standard portion 42a of the second island 42 as shown in FIG. 4. The correlation operation of this embodiment can be distinguished into first to third operation modes. In the first operation mode, the data of pixels in the vicinity of the right end of the block S3 are compared with the data of pixels in the vicinity of the left end of the reference portion 42b. In the second operation mode, all the data of pixels of the block S3 are compared with all the data of pixels of the reference portion 42b. In the third operation mode, the data of pixels in the vicinity of the left end of the block S3 are compared with the data of pixels in the vicinity of the right end of the reference portion 42b. The first to third operation modes can be applied to the correlation operation for all the blocks S1 to S9 of the first to fourth islands 41 to 44.

In FIG. 4, the data of pixels of the block S3 are serially designated by b(1), b(2) ... b(N) from the left to the right. Similarly, the data of pixels of the reference portion 42b are serially designated by r(1), r(2) ... r(T) from the left to the right. A number N of the pixels of the block S3 is equal to 26 (N=26). A total number T of pixels of the reference portion 42b is equal to 56 (T=56). An offset number M of the pixels in the left hand is equal to 15 (M=15). An offset number L of the pixels in the right hand is equal to 15 (L=15). A number of pixels which are to be shifted (order of correlation operation) is designated by k (k=0 to (M+T−N+ L=60)). A correction factor is designated by R(k). A discordance quantity in the k-th correlation operation of the n-th island is designated by Hn(k).

In the first operation mode, the M (M=15) number of the data of pixels from the left end of the block S3 are previously offset from the data of pixels to be compared. A discordance quantity H2(0) is calculated (or operated) by using eleven data of pixels b(16) to b(26) of the block S3 and the eleven data of pixels r(1) to r(11) of the reference portion 42b. Next, data of pixel b(15) which was offset from and adjoining the above-mentioned eleven data is added into the data of pixels of the block S3 to be compared. A discordance quantity H2(1) is calculated by using twelve data of pixels b(15) to b(26) of the block S3 and the twelve data of pixels r(1) to r(12) of the reference portion 42b. Finally, fifteen discordance quantities H2(k) (k=0 to 14) are calculated by the operation adding data of pixel one by one. General expression of the discordance quantity Hn(k)(k=0 to (M−1)) in the first operation mode is shown in the following equation (1).

In the second operation mode, since all the data of pixels of the block S3 are compared with all the data of pixels of the reference portion 42b, a first discordance quantity H2(15) in the second operation mode is calculated by using twenty six data of pixels b(1) to b(26) of the block S3 and twenty six data of pixels r(1) to r(26) of the reference portion 42b. A second discordance quantity H2(16) in the second operation mode is $$Hn(k) = \sum_{j=1}^{N} |b(j) - r(k - M + j)| \quad (1)$$

calculated by using twenty six data of pixels b(1) to b(26) of the block S3 and twenty six data of pixels r(2) to r(27) of the reference portion 42b. Finally, thirty one discordance quantities H2(k) (k=15 to 45) are calculated by the operation. General expression of the discordance quantity Hn(k)

$$Hn(k) = R(k) \sum_{j=1}^{M-N+k} |b(M + j) - r(j)| \quad (2)$$

(k=M to (M+T−N+1)) in the first operation mode is shown in the following equation (2).

In the third operation mode, one data of pixel at the right end of the block S3 is previously offset from the data of pixels to be compared. A discordance quantity H2(46) is calculated by using twenty five data of pixels b(1) to b(25) of the block S3 and the twenty five data of pixels r(31) to r(56) of the reference portion 41b. Next, a data of pixel b(31) which is included in and positioned at the end of the data of pixels of the block S3 to be compared is deleted. A discordance quantity H2(47) is calculated by using twenty four data of pixels b(1) to b(24) of the block S3 and the twenty four data of pixels r(32) to r(56) of the reference portion 42b. Finally, fifteen discordance quantities H2(k)(k=46 to 60) are calculated by the operation deleting one data of pixel one by one. General expression of the discordance quantity Hn(k) (k=(M+T−N) to (M+T−N+L)) in the third operation mode is shown in the following equation (3).

$$Hn(k) = R(k) \sum_{j=1}^{N-L} |b(j) - r(k + j)| \quad (3)$$

Figure 5A:
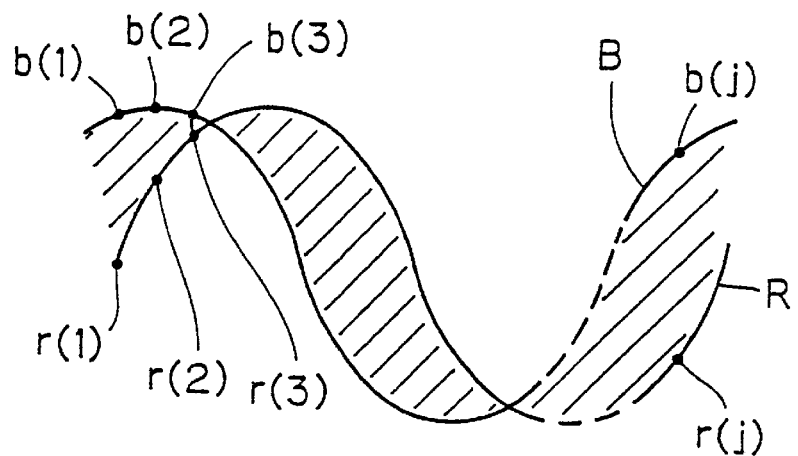
FIGS. 5A to 5C are drawings showing a concept of a discordance quantity Hn(k) which is used in the correlation operation in the focus detector of the embodiment of this invention.
Figure 5B:
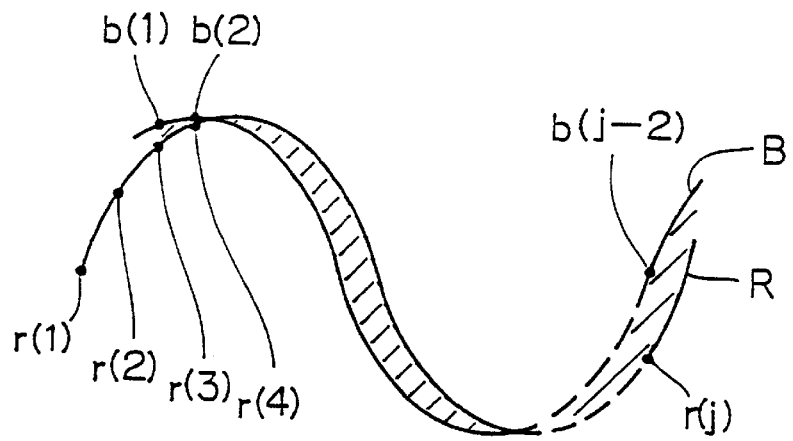
Figure 5C:
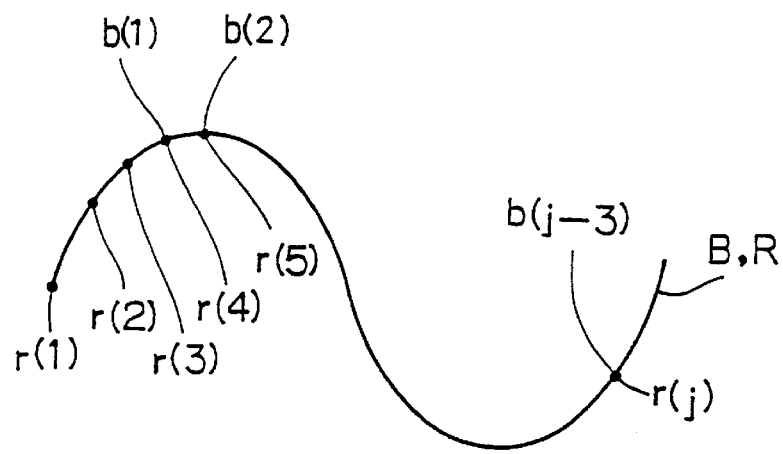

Hereupon, the discordance quantity Hn(k) is described with reference to an example of the second operation mode shown in FIGS. 5A to 5C. In FIGS. 5A to 5C, a curve B binds the data of pixels b(1) to b(j) of the standard portion 42a of the second island 42 and a curve R binds the data of pixels r(1) to r(j) of the reference portion 42b of the second island 42.

In FIG. 5A, the data of pixels b(1) to b(j) of the block S3 are compared with the data of pixels r(1) to r(j) of the reference portion 42b. An area of a cross-hatched region between the curves B and R corresponds to the first discordance quantity H2(15) (generally expressed as Hn(M)) in the second operation mode.

In FIG. 5B, the data of pixels b(1) to b(j−2) of the block S3 are compared with the data of pixels r(3) to r(j) of the reference portion 42b. An area of a cross-hatched region between the curves B and R corresponds to the third discordance quantity H2(17) (generally expressed as Hn(M+ 2)) in the second operation mode. In comparison with FIG. 5A, the curve B closes to the curve R, so that the area of the cross-hatched region becomes narrower.

In FIG. 5C, the data of pixels b(1) to b(j−3) of the block S3 are compared with the data of pixels r(4) to r(j) of the reference portion 42b. An area of a region between the curves B and R corresponds to the fourth discordance quantity H2(18) (generally expressed as Hn(M+3)) in the second operation mode. The curve B substantially coincides with the curve R, so that the area of the region between the curves B and R becomes substantially zero.

After operating all the discordance quantities Hn(k)(k=0 to (M+T−N+L)) with respect to all the blocks S3 to S5 of the second island 42, a position showing the smallest discordance quantity Hn(k) is judged as a focus of the optical lens system 201 by the second island 42. In this example, the discordance quantity Hz2(18) shown in FIG. 5C is the smallest, so that this condition is judged that the optical lens system 201 is focused on the object.

The example shown in FIGS. 5A to 5C is an ideal case. Generally, the discordance quantity Hn(k) is not necessarily be zero even when the focus of the optical lens system 201 is focused on the object. Furthermore, the value of the discordance quantity Hn(k) varies corresponding to the number of data of pixels which are compared, even when the condition of the focus detection is constant. Especially, in the first and third operation modes, since the number of data of pixels which are used for the correlation operation changes, the discordance quantities cannot be compared directly in the same operation mode. Thus, a concept of correction factor R(k) is used. As an example of the correction factor R(k), each value of the discordance quantity Hn(k) is standardized by a ratio of a total amount of absolute values of differences between two outputs from adjoining two pixels used in a correlation operation. Alternatively, each value of the discordance quantity Hn(k) is standardized by a ratio of a number of pixels used in a correlation operation.

Figure 6A:
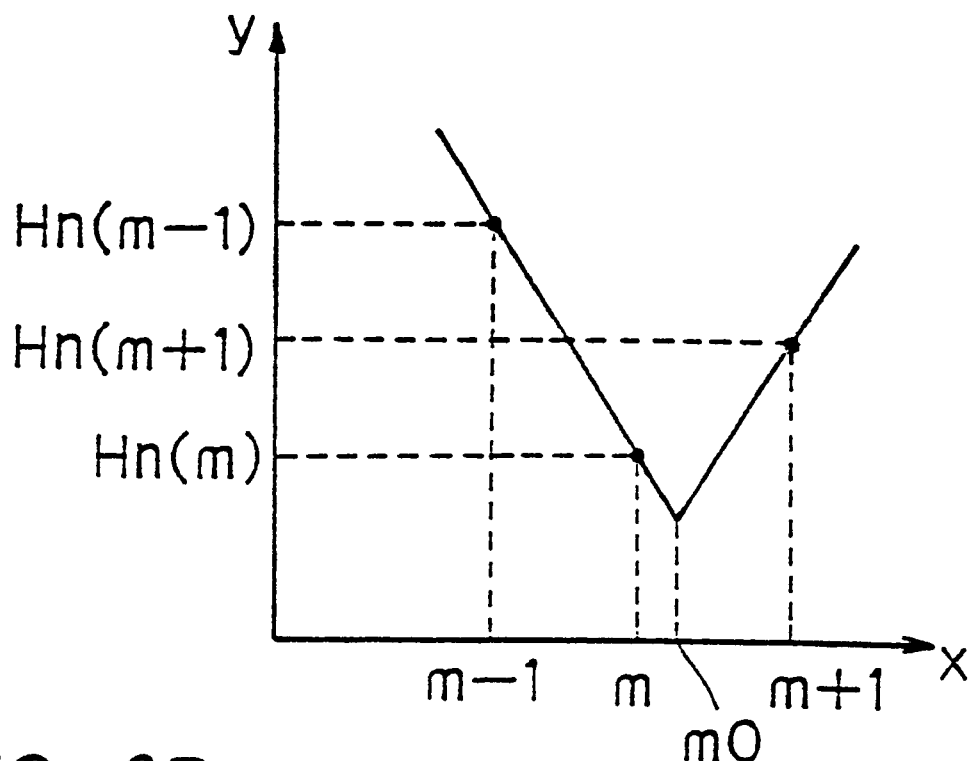
FIGS. 6A and 6B are drawings showing interpolations used with the correlation operation in the focus detector of the embodiment of this invention.
Figure 6B:
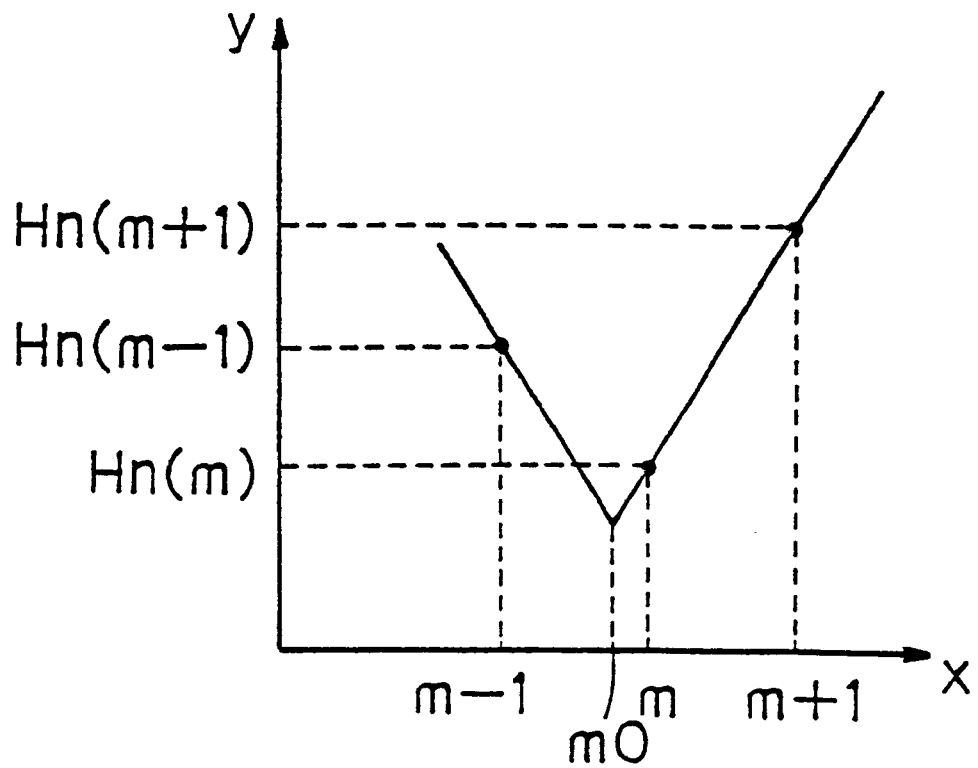

As shown in FIG. 6A or 6B, when a position m0 at which the discordance quantity Hn(k) becomes minimum is positioned between pixels m and m+1 or m−1, an interpolation is calculated by the following equation (4). Since this interpolation is known, the explanation of the interpolation is omitted.

$$m0 = m + \frac{1}{2} \cdot \frac{Hn(m-1) - Hn(m+1)}{h - Hn(m)} \quad (4)$$
$$h = \max(Hn(m-1), Hn(m+1))$$

In the example shown in FIGS. 5A to 5C, the discrepancy between the data of pixels of the standard portion 42a and the data of pixels of the reference portion 42b of the second island 42 is three pixels. The focus detector 140 detects a quantity and a direction of the discrepancy between the position of an image of the object 2 owing to the optical lens system 201 and the focal plane (or a film surface) 1. Corresponding to the focal length of the optical lens system 201, there is a relation between a defocus quantity of the optical lens system 201 and a displacement of the image. Thus, the defocus quantity of the optical lens system 201 can be calculated by using a factor corresponding to the focal length of the optical lens system 201, the discrepancy of the data of pixels, and so on. The moving direction of the optical lens system 201 corresponds to the direction of the discrepancy of the data of pixels.

Figure 7:
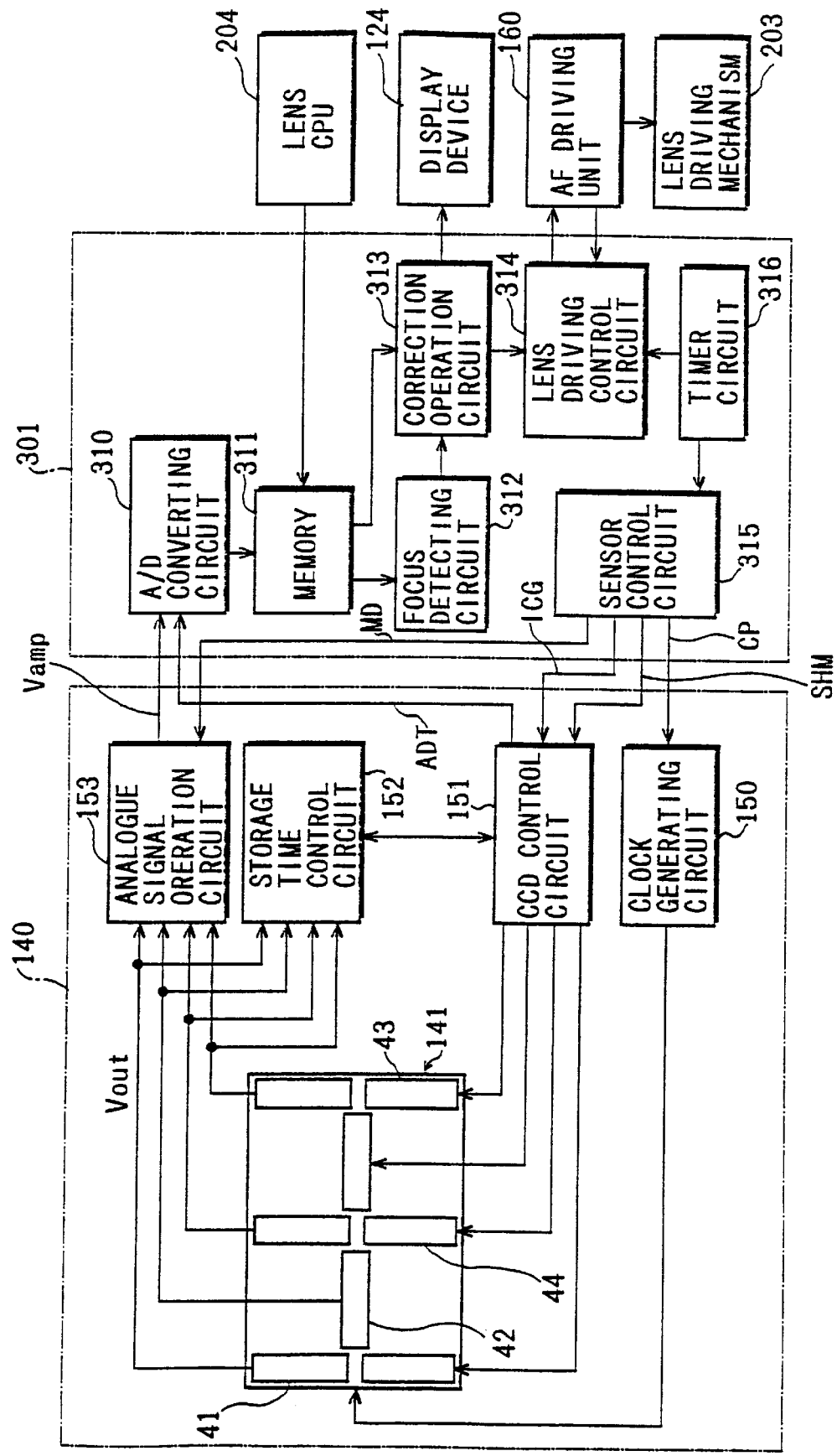
FIG. 7 is a block diagram showing a configuration of a control circuit of the camera using the focus detector of the embodiment of this invention.

A block diagram of a control circuit configured by a connection of the AF-CPU 301 and the focus detector 140 is shown in FIG. 7. The focus detector 140 further comprises a crock generating circuit 150, a CCD control circuit 151, a storage time control circuit 152 and an analogue signal operation circuit 153. The crock generating circuit 150 supplies a driving crock to the sensor tip 141. The CCD control circuit 151 controls charge storage and charge sweep out of the pixels of the standard portions 41a to 44a and the reference portions 41b to 44b of the islands 41 to 44 of the sensor tip 141. The storage time control circuit 152 controls a time for the charge storage of the pixels of the standard portion 41a to 44a and the reference portion 41b to 44b of each island 41 to 44 corresponding to each output signal Vout from each island 41 to 44. The storage time control circuit 152 makes the time for the charge storage shorter when the luminance of the object 2 is higher, and it makes the time longer when the luminance of the object 2 is lower, with respect to each islands 41 to 44. The analogue signal operation circuit 153 amplifies the output signal Vout from each island 41 to 44.

The AF-CPU 301 comprises an A/D converter 310, a memory 311 such as a RAM (Random Access Memory), a focus detecting circuit 312, a correction operation circuit 313, a lens driving control circuit 314, a sensor control circuit 315 and a timer circuit 316.

The A/D converter 310 converts the analogue signal Vamp from the analogue signal operator 153 to a digital signal. The memory 311 stores the A/D converted digital signals, an information of the focal length of the optical lens system 201 outputted from the lens CPU 204, and so on. The focus detecting circuit 312 detects the position of the focus of the optical lens system 201 by using the A/D converted digital signals. The correction operation circuit 313 calculates a quantity of defocus that is the moving quantity of the optical lens system 201 by using the data of the focus of the optical lens system 201, the focal length of the optical lens system, and so on. Furthermore, the correction operation circuit 313 outputs a focusing signal to the display device 124 when the optical lens system 201 is focused on the object 2. The lens driving control circuit 314 controls the driving of the AF driving unit 160 and the lens driving mechanism 203 responding to the calculated quantity of defocus. The sensor control circuit 315 outputs a predetermined crock pulse (CP) to the clock generating circuit 150. The sensor control circuit 315 further outputs a charge storage signal (ICG) and a charge sweep out signal (SHM) to the CCD control circuit 151, and outputs a mode switching signal for switching amplifying mode to the analogue signal operation circuit 153. The timer circuit 316 outputs a predetermined timing signal to the lens driving control circuit 314 and the sensor control circuit 315.

Some amplifying modes of the output signals of the islands 41 to 44 are described. Generally, when the contrast value of the object 2 is lower, since variation of the output signal Vout of the island 41 to 44 is small, it is difficult to detect the focus of the optical lens system 201 by using the output signals Vout directly. Thus, the output signals Vout of the islands 41 to 44 are amplified so as to obtain the variation of the output signals by which the focus of the optical lens system 201 can be detected.

Figure 8A:
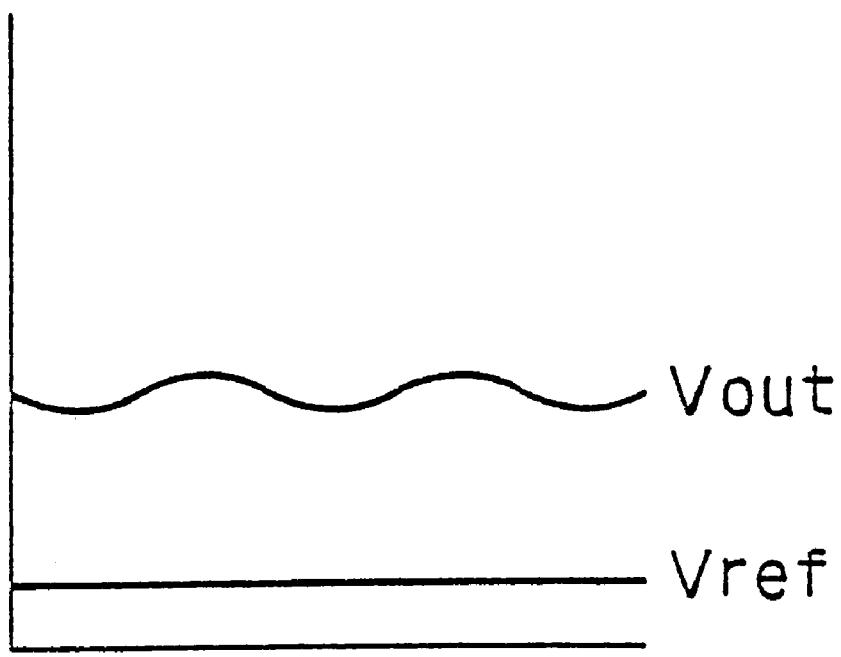
FIGS. 8A and 8B are drawings showing an amplification of output signals from pixels of the photoelectric transfer element array by a normal mode (NM mode) amplification in the focus detector of the embodiment of this invention.
Figure 8B:
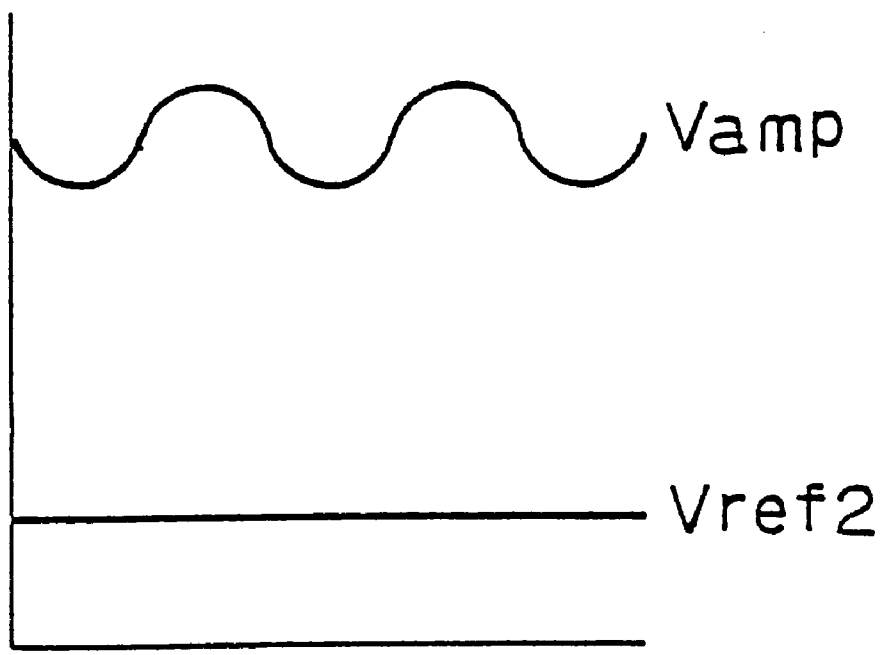

A normal amplifying mode (NM mode) is described with reference to FIGS. 8A and 8B. In FIG. 8A, a curve designated by Vout shows the output signal of one of the islands 41 to 44 of the sensor tip 141 before the amplification and a solid straight line designated by Vref shows a dark output voltage of one of the islands 41 to 44 before the amplification. In FIG. 8B, a curve designated by Vamp shows the amplified output signal and a solid straight line designated by Vref2 shows the amplified dark output voltage. The NM mode amplifies the output signals Vout with respect to the dark output voltage Vref. Such NM mode is effective when both of the contrast value and the luminance of the object are lower.

Figure 9A:
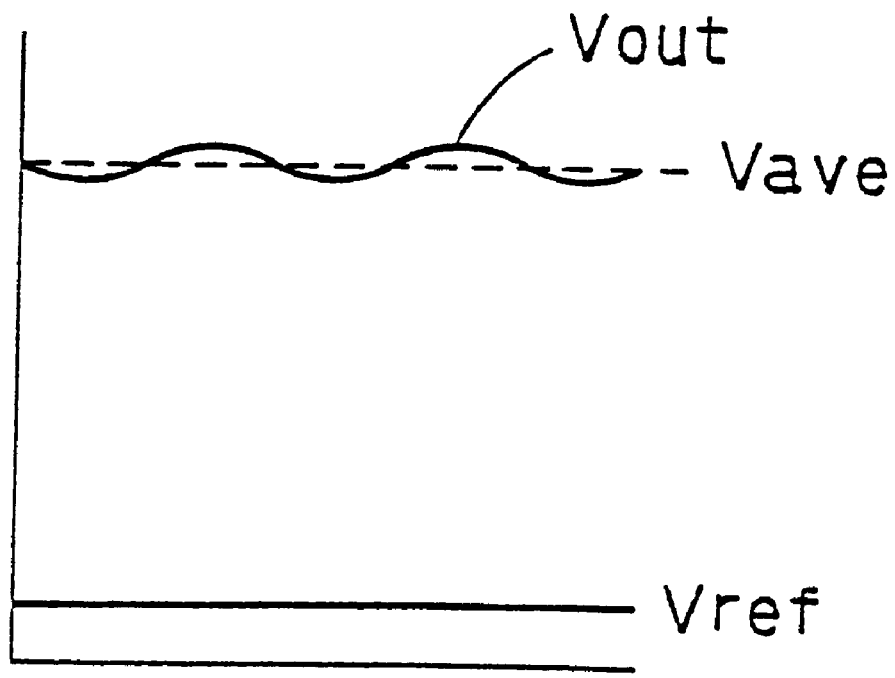
FIGS. 9A and 9B are drawings showing another amplification of output signals from pixels of the photoelectric transfer element array by a low contrast mode (LC mode) amplification in the focus detector of the embodiment of this invention.
Figure 9B:
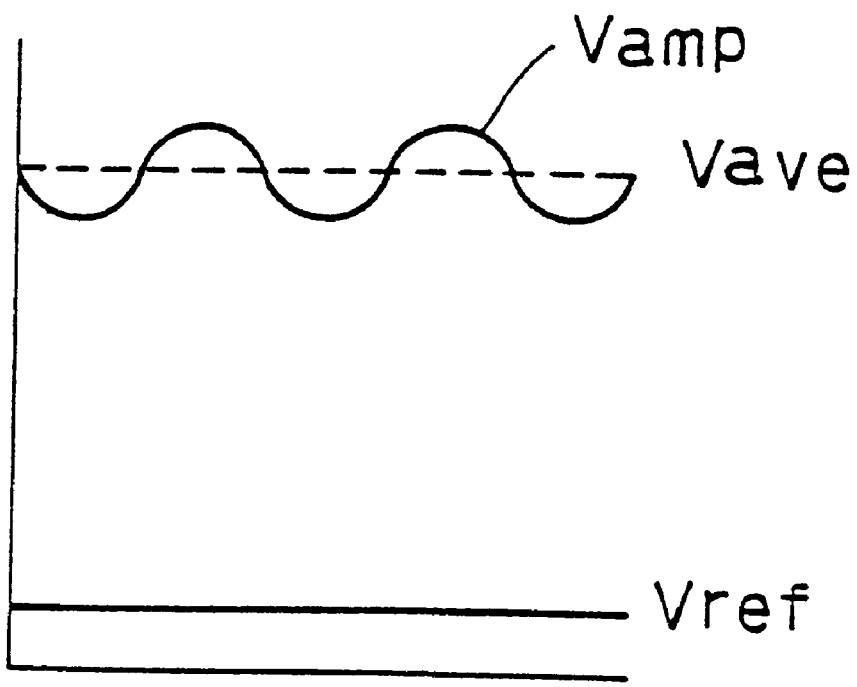

When the contrast value of the object 2 is lower but the luminance thereof is higher, if the output signals Vout of the islands 41 to 44 are merely amplified with respect to the dark output voltage Vref, the amplified output signals Vamp will be overflow a limit voltage which can be treated in the AF-CPU 301. Thus, it is now proposed to use an amplifying mode (LC mode) together with the NM mode. In the LC mode, the output voltage Vout is amplified with reference to an average voltage Vave of the effective output voltages of the pixels. The LC mode amplification is shown in FIGS. 9A and 9B. In FIG. 9A, a curve designated by Vout shows the output signal of one of the islands 41 to 44 of the sensor tip 141 before the amplification, a solid straight line designated by Vref shows a dark output voltage of one of the islands 41 to 44 before the amplification and a dotted straight line designated by Vave shows the average voltage of the effective output signals of the pixels. In FIG. 9B, a curve designated by Vamp shows the amplified output signal, a solid straight line designated by Vref shows the dark output voltage before the amplification and a dotted line designated by Vave shows the average voltage of the output signals before the amplification.

Figure 10:
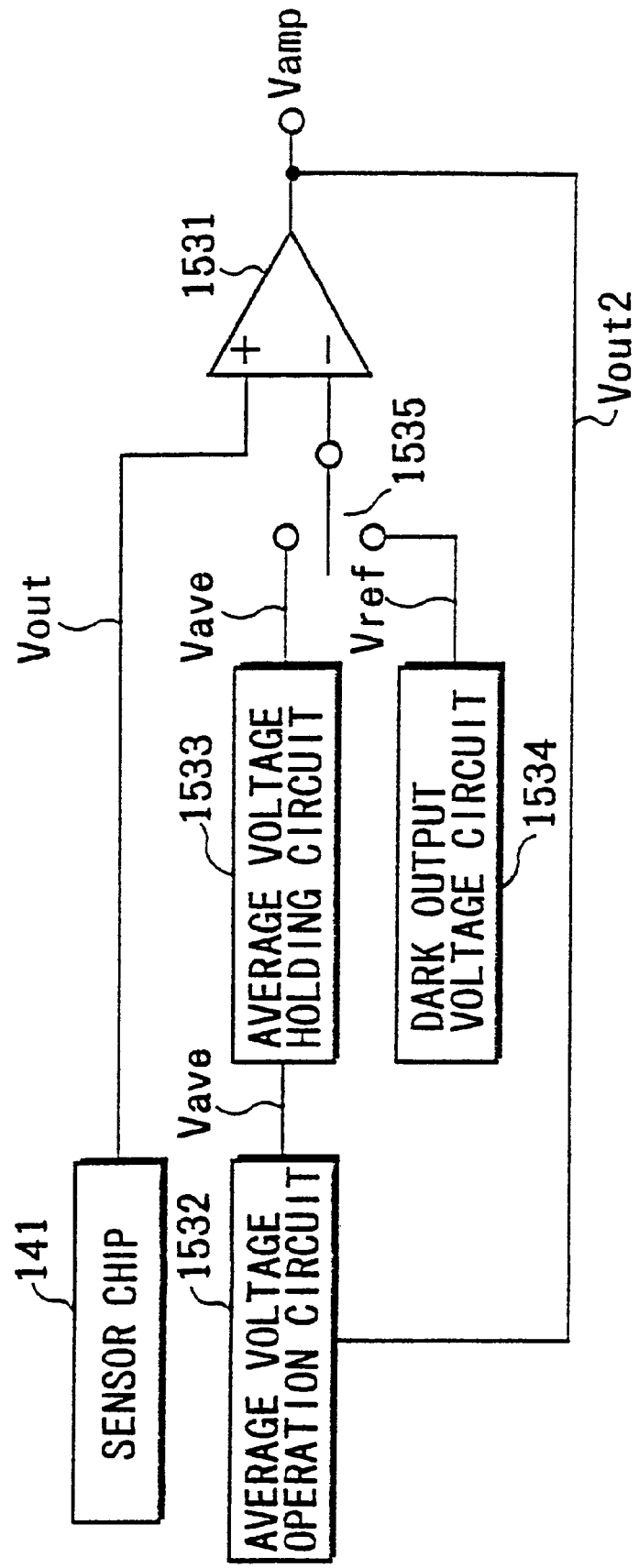
FIG. 10 is a block diagram showing a modification of an analogue signal operation circuit 153 shown in FIG. 7.

An example of a configuration of the analogue signal operation circuit 153 is shown in FIG. 10. The output signal Vout from one of the islands 41 to 44 of the sensor tip 141 is entered into a non-inverted input terminal designated by + of an OP amp (Operational Amplifier) 1531. The output voltage Vout2 of the OP amp 1531 before the amplification is entered into an average voltage operation circuit 1532. The average voltage Vave of the effective output of the pixels is calculated by the average voltage operation circuit 1532. The average voltage Vave is entered into an average voltage holding circuit 1533 so as to hold the average voltage Vave. A switch 1535 is connected to an inverted input terminal designated by − of the OP amp 1531, one of the dark output voltage Vref from a dark output voltage circuit 1534 and the average voltage Vave from the average voltage holding circuit 1533 is alternatively entered into the OP amp 1531. When the switch 1535 selects the dark output voltage Vref, the output signal Vout is amplified with respect to the dark output voltage Vref by the above-mentioned NM mode shown in FIGS. 8A and 8B. Alternatively, when the switch 1535 selects the average voltage Vave, the output signal Vout is amplified with respect to the average voltage Vave by the above-mentioned LC mode shown in FIGS. 9A and 9B.

Figure 11:
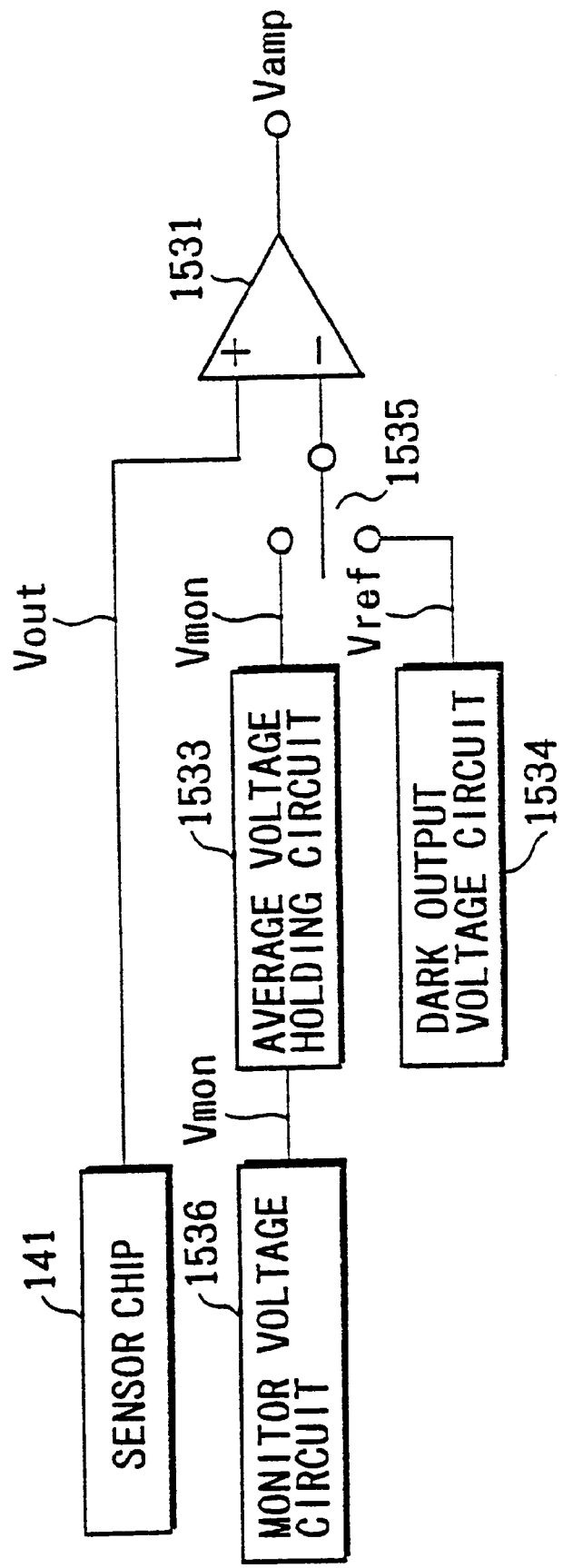
FIG. 11 is a block diagram showing another modification of the analogue signal operation circuit 153 shown in FIG. 7.
Figure 12:
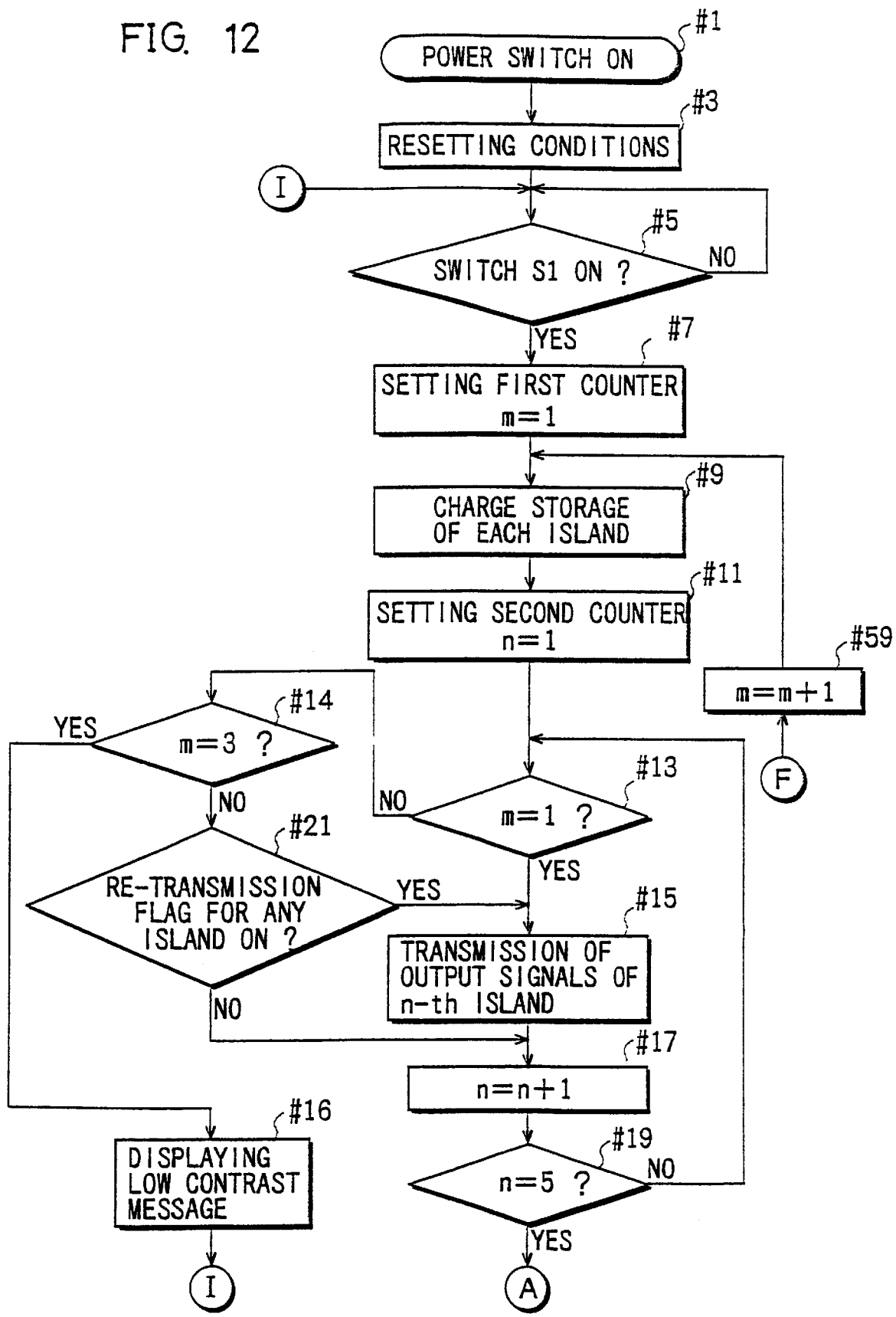
Figure 13:
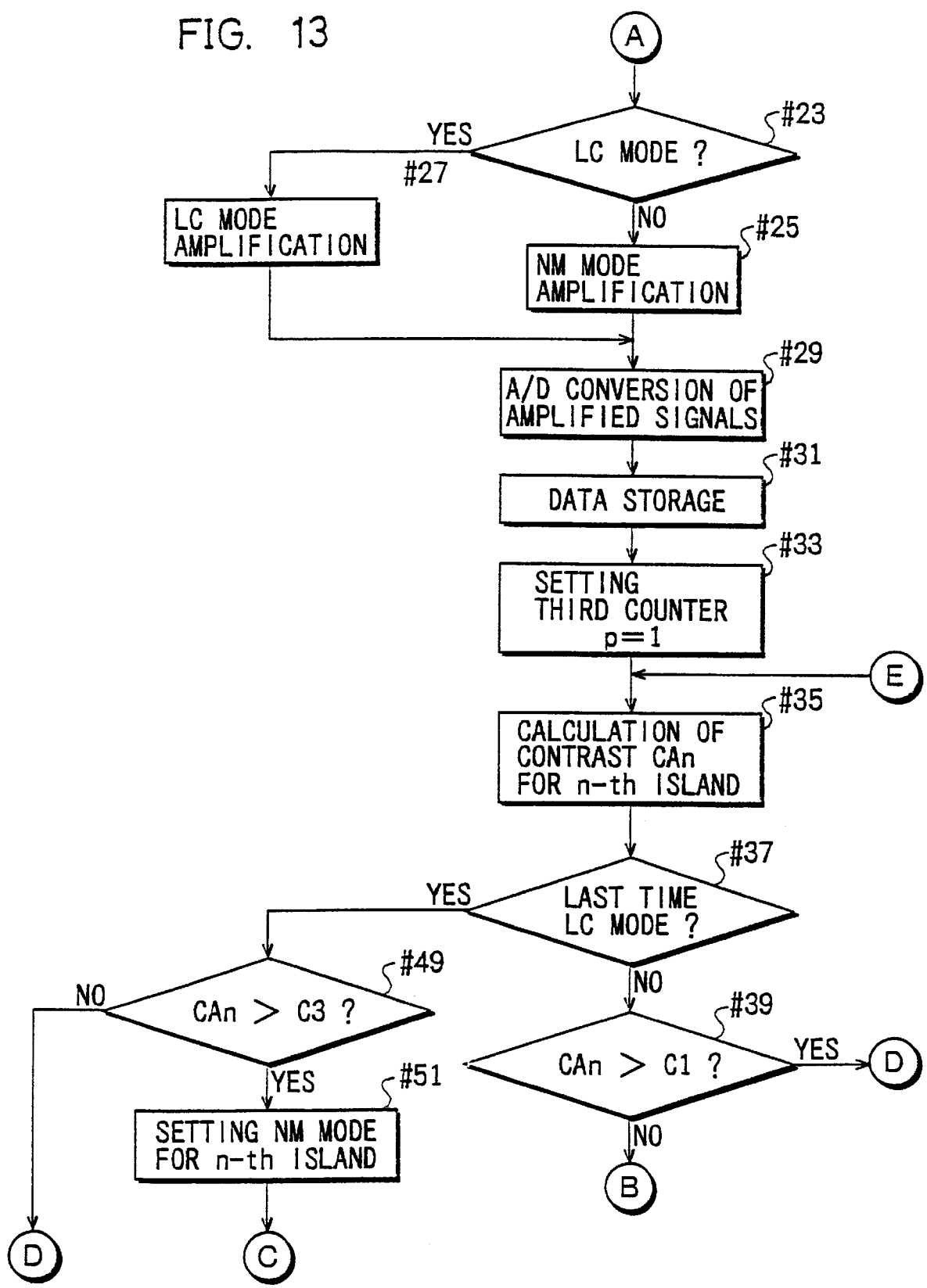
Figure 14:
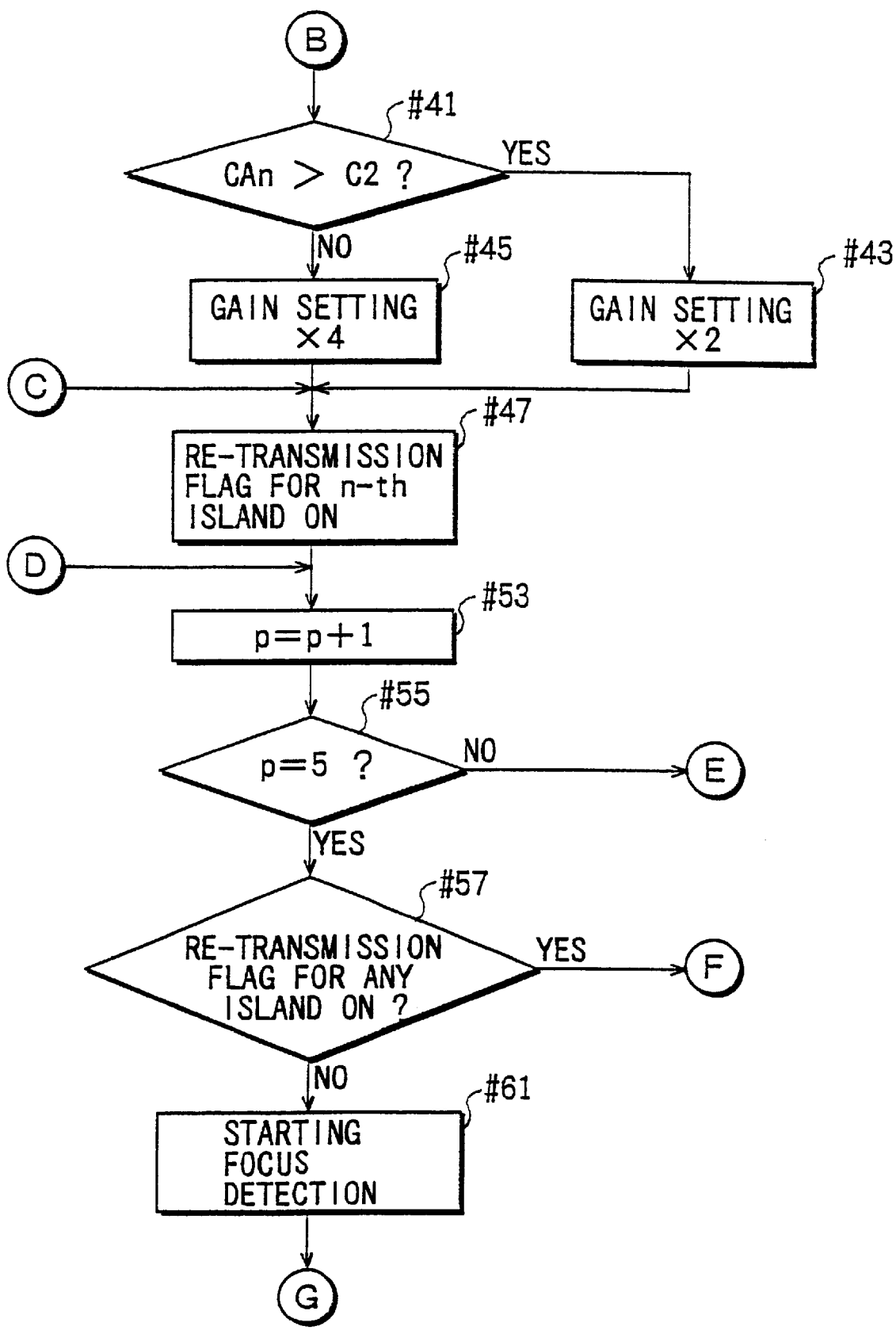
Figure 15:
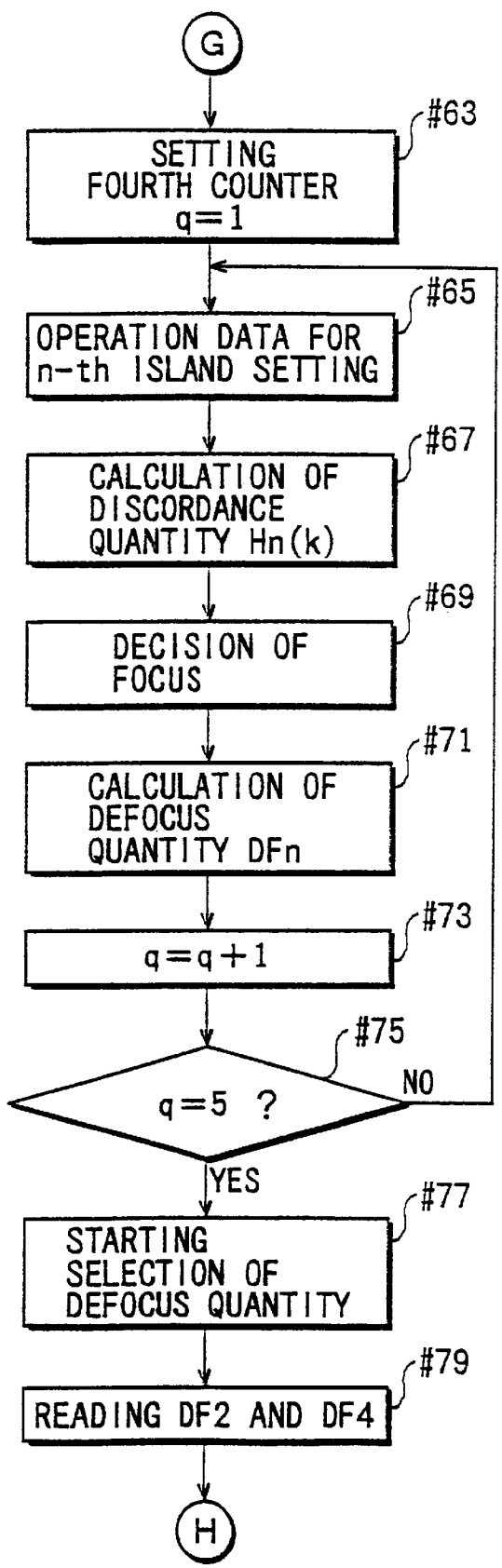
Figure 16:
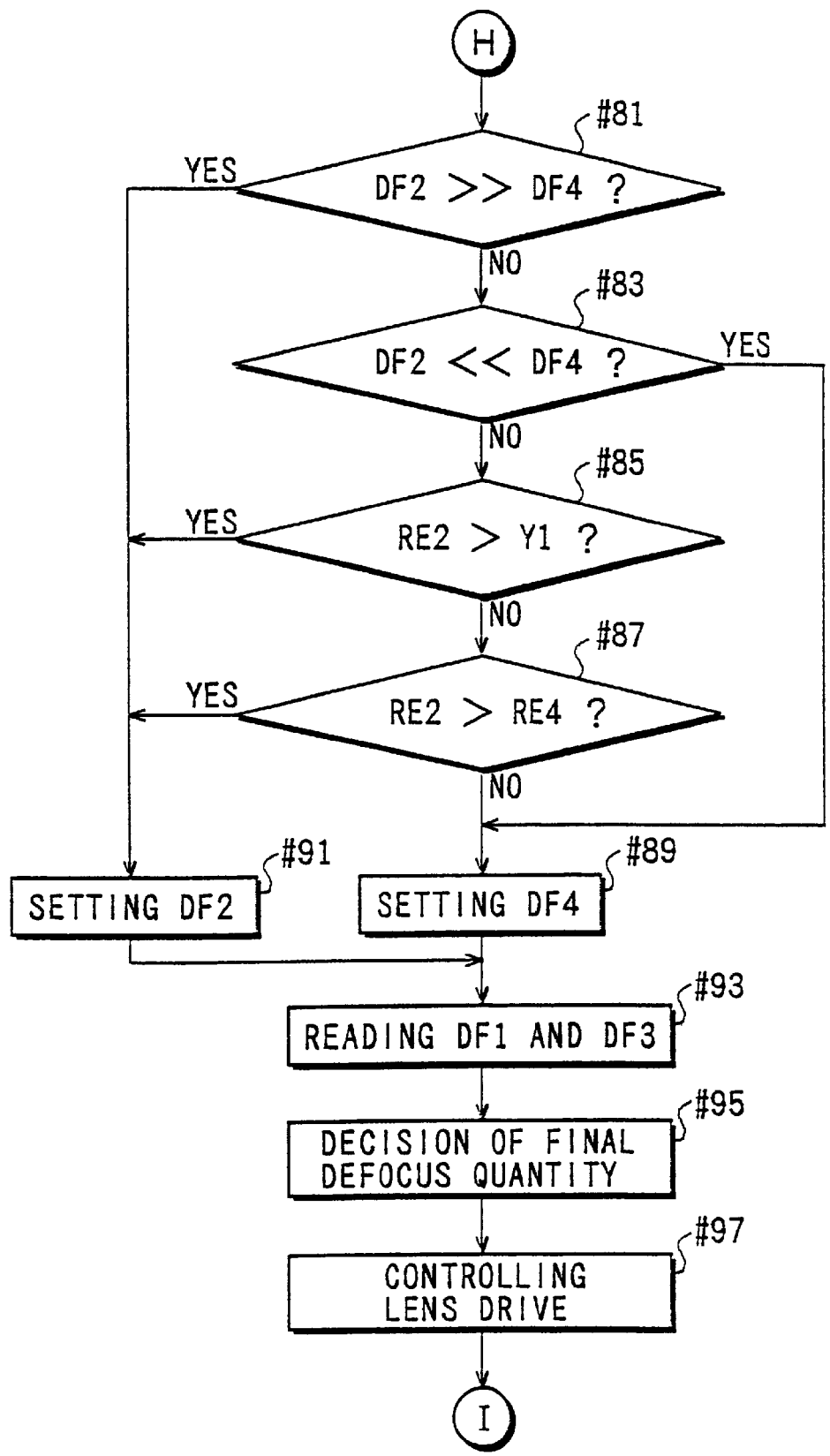
Figure 17:
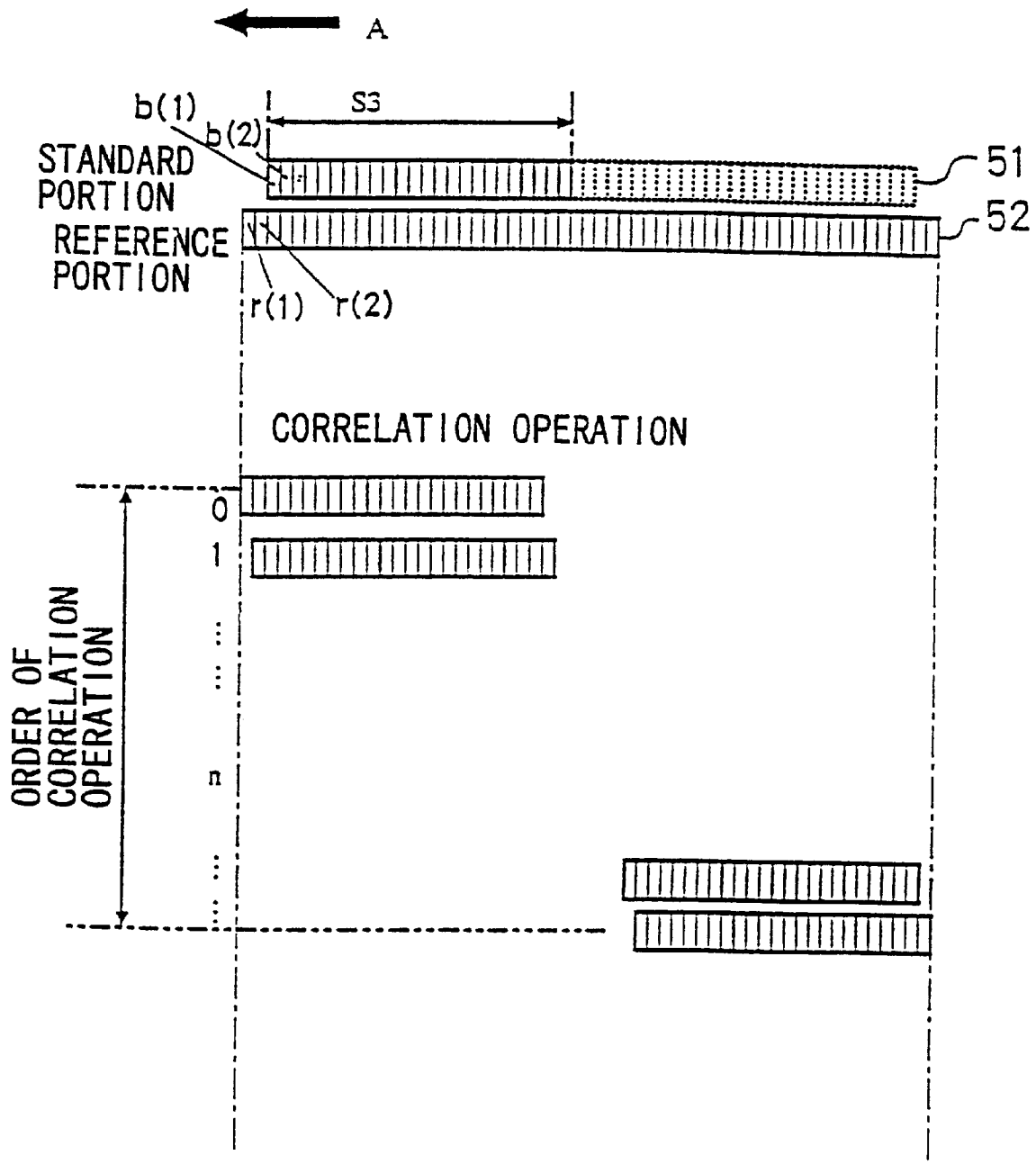
FIG. 17 is the drawing showing the conventional correlation operation by the conventional focus detector.

Another example of a configuration of the analogue signal operation circuit 153 is shown in FIG. 11. In the LC mode amplification, the reference voltage entered into the inverted input terminal of the OP amp 1531 is not necessarily the average voltage Vave of the output signals of pixels. A constant voltage near to the average voltage Vave can be used. In the example shown in FIG. 11, a monitor voltage Vmon from a monitor voltage circuit 1536 which is near to the average voltage is used instead of the average voltage Vave. By such a configuration, it is not necessary to calculate the average voltage Vave from the effective output signals of the pixels, so that not only the configuration of the circuit becomes simple but also operation time becomes shorter.

A motion of this embodiment is described with reference to a flow chart shown in FIGS. 12 to 16. When a power switch of the camera body 100 is turned on (Step #1), the AF-CPU 301 resets all conditions of the camera body 100 (Step #3). Furthermore, the AF-CPU 301 judges whether a switch S1 (not shown in the figure) is turned on or not (Step #5). The switch S1 turns on when a shutter release button is pushed down to halfway of a stroke of the shutter release button. When the switch S1 is turned on, a user touches his finger on the shutter release button and he wishes to take a photograph, so that the AF-CPU starts to detect the focus of the optical lens system 201.

Next, the AF-CPU 301 sets a first counter m=1 for counting the number of charge storage of the sensor tip 141 (Step #7). The AF-CPU 301 controls the sensor control circuit 315 in order to store the electric charge in each pixel of the islands 41 to 44 of the sensor tip 141 (Step #9). At the same time, the AF-CPU 301 sets a second counter n=1 for transmitting the data of pixels of the islands 41 to 44 to the analogue signal operation circuit 153 (Step #11). Hereupon, the island in which the data of pixels are transmitted is called the n-th island (n=1 to 4).

Next, the AF-CPU 301 judges whether a counted value m of the first counter is one (m=1) or not (Step #13). When the counted value m of the first counter is equal to one (m=1) that is the first charge storage of the sensor tip 141, the AF-CPU 301 transmits the output signals of the n-th island (Step #15). After the transmission of the output data of the n-th island, the AF-CPU 301 increases the counted value n of the second counter to n+1 (Step #17). The AF-CPU 301 judges whether the counted value n of the second counter reaches to five (n=5) or not that is the output signals of the final fourth island 44 is transmitted or not (Step #19).

On the other hand, when the counted value m of the first counter is not equal to one (m≠1) in step #13, the AF-CPU 301 judges whether the counted value in of the first counter is equal to three (m=3) or not (Step #14). When the counted value m of the first counter is equal to three (m=3), the contrast value of the image on the n-th island in the second charge storage is too low to detect the focus of the optical lens system 201, so that the AF-CPU displays a low contrast message in the display device 124 (Step #16).

When the counted value m of the first counter is not three (m≠3) in step #14, it means that the electric charge is twice stored in the pixels of the islands 41 to 44 of the sensor tip 141. Since the output signals of any of the first to fourth islands 41 to 44 are demanded to be re-transmitted, the AF-CPU 301 judges whether a re-transmission flag is turned on or not (Step #21). When the re-transmission flag is turned on, the output signals of the n-th island of the sensor tip 141 is transmitted to the AF-CPU 301 (Step #15). Alternatively, when the re-transmission flag is not turned on, the AF-CPU 301 increases the counted value n of the second counter to n+1 (Step #17) and executes the above-mentioned operation with respect to another island.

Furthermore, the AF-CPU 301 amplifies the output signals of the n-th island, which are serially transmitted, by the analogue signal operation circuit 153. At this time, the AF-CPU 301 judges whether the LC mode is specified as a method for amplifying the output signals of the n-th island or not (Step #23). When the counted value m is equal to one (m=1) in step #11, the electric charge is stored at first in the pixels of the islands 41 to 44 of the sensor tip 141 and all the settings of the camera body 100 is reset in step #3. The analogue signal operation circuit 153 amplifies the output signals by the NM mode (Step #25). On the other hand, when the LC mode is specified as the amplifying method in step #23, the analogue signal operation circuit 153 amplifies the output signals by the LC mode (Step #27). The amplified output signals are converted from analogue signals to digital data by the A/D converter 310 (Step #29), and the A/D converted data are stored in the memory 311 (Step #31).

Next, the AF-CPU 301 sets a third counter p=1 for calculating contrast values of the first to fourth islands 41 to 44 (Step #33). The AF-CPU 301 serially calculates the contrast values with respect to the first to fourth islands 41 to 44 by using the data stored in the memory (Step #35). Hereupon, the island with which the contrast value is calculated is called the n-th island (n=1 to 4), and the calculated contrast value is designated by CAn.

Furthermore, the AF-CPU 301 judges whether the last amplification with respect to the n-th island is executed by the LC mode or not (Step #37). When the electric charge is stored at first in the pixels of the islands 41 to 44 of the sensor tip 141, the output signals of the islands 41 to 44 are respectively amplified by the NM mode. Thus, the AF-CPU 301 compares the calculated contrast value CAn with respect to the n-th island with a first comparative value C1 (Step #39). When the calculated contrast value CAn is equal to or larger than the first comparative value C1 (CAn≦C1), the AF-CPU 301 further compares the contrast value CAn with respect to the n-th island with a second comparative value C2 (Step #41).

When the contrast value CAn is larger than the second comparative value C2 that is C1≧CAn>C2 in Step #41, the AF-CPU 301 sets a gain for amplifying the output signal of the n-th island by the LC mode as twofold (×2) (Step #43). On the other hand, when the contrast value CAn with respect to the n-th island is not larger than the second comparative value (C2≧CAn) in step #43, the AF-CPU 301 set a gain for amplifying the output signals of the n-th island by the LC mode as fourfold (×4) (Step #45). In both case, the AF-CPU 301 turns on the re-transmission flag which is judged in the step #21 so as to transmit the output signals of n-th island in step #15 (Step #47).

When the last amplification is executed by the LC mode in step #37, the contrast value CAn with respect to the n-th island is essentially higher, since the contrast value CAn is calculated by using the amplified output signals which are obtained by the charge storage twice or more and amplified by the LC mode. Thus, the AF-CPU 301 compares the contrast value CAn with respect to the n-th island with a third comparative value C3 (C3>C1>C2).

When the contrast value CAn with respect to the n-th island is larger than the third comparative value C3(CAn>C3), the contrast value CAn is too high to detect the focus of the optical lens system 201. Thus, the AF-CPU 301 re-specifies the NM mode as a method for amplifying the output signals of the n-th island (Step #51). Furthermore, the AF-CPU 301 turns on the re-transmission flag for re-transmitting the output of the n-th island which is amplified by the NM mode (Step #47).

When the contrast value CAn is larger than the first comparative value C1(CAn>C1) in step #39 and when the contrast value CAn is not larger than the third comparative value C3 (CAn≦C3) in step #49, the calculated contrast value CAn with respect to the n-th island is proper, so that the AF-CPU 301 increases a counted value p of the third counter to p+1 (Step #53). Furthermore, the AF-CPU 301 judges whether the counted value p of the third counter is equal to five (p=5) or not (step #55). When the counted value p of the third counter is equal to five (p=5), it means that the contrast value CA4 of the fourth island 44 is already compared with all the comparative values C1 to C3. When the counted value p is smaller than five (p<5), the contrast value of the next island CAn+1 is calculated and the contrast value CAn+1 is compared with the comparative values C1 to C3 (Steps #35 to #53).

When the calculation of the contrast values and comparison of the contrast values with the comparative values C1 to C3 with respect to all the islands 41 to 44 are completed in step #55, the AF-CPU 301 judges whether the re-transmission flag is turned on with respect to any of the islands 41 to 44 or not (Step #57). When the re-transmission flag is turned on with respect to any island, since the output signals of the island are demanded to be transmitted, the AF-CPU 301 increases the counted value m of the first counter to m+1 (Step #59) and repeats the flow from step #9 to #57.

When the re-transmission flag is not turned on with respect to every islands 41 to 44 in step #57, the contrast values CAn (n=1 to 4) with respect to the first to fourth islands 41 to 44 are in a proper region (C3>CAn>C2). Then, the AF-CPU 301 starts to detect the focus of the optical lens system 201 by using the data stored in the memory 311 (Step #61).

When the focus detection starts, the AF-CPU 301 sets a fourth counter q=1 (Step #63). The AF-CPU 301 sets the number M of pixels of each block of the standard portion, the number T of total pixels of the reference portion, the offset quantities L and M in the upper and lower or the right and left, the correction factor R(k), and so on with respect to the n-th island (n=1 to 4) (Step #65). Furthermore, the AF-CPU 301 calculates totally (M+T−N+L+1) number of the discordance quantities Hn(k) by following the above-mentioned equations (1) to (3) with respect to the first to third operation modes with using the data of pixels of the standard portion and the reference portion of the n-th island read out from the memory 311 (Step #67). When the operation of all the discordance quantities Hn(k) is completed, the AF-CPU 301 compares the discordance quantities Hn(k) with each other, and finds a position where the discordance quantity Hn(k) becomes the smallest. The AF-CPU 301 decides the position as a focus of the optical lens system 201 (Step #69). When the interpolation is necessary, the AF-CPU 301 executes the interpolation by following the above-mentioned equation (4). When the position of the focus of the optical lens system 202 is decided, the AF-CPU 301 calculates the defocus quantity that is the moving quantity of the optical lens system 201 based on the data of the focus (step #71). The calculated defocus quantity is stored in the memory 311. After the calculation of the defocus quantity, the AF-CPU 301 increases the counted value q of the fourth counter to q+1 (Step #73) and judges whether all the defocus quantities with respect to the first to fourth islands 41 to 44 are calculated or not (Step #75).

When all the defocus quantity with respect to all the islands 41 to 44 are calculated, the AF-CPU 301 starts to an algorithm for selecting one defocus quantity by which the movement of the optical lens system 201 is controlled among a plurality of defocus quantities (Step #77). At first, the AF-CPU 301 reads two defocus quantities DF2 and DF4 of the second and fourth islands 42 and 44 which are disposed for forming a cross sensor at the center of the sensor tip 141 (Step #79). Next, the AF-CPU 301 judges whether the defocus quantity DF2 of the second island 42 is much larger than the defocus quantity DF4 of the fourth island 44 or not (Step #81). This judgement is executed by comparing an absolute value of a difference between the defocus quantity DF2 of the second island 42 and the defocus quantity DF4 of the fourth island 44 with a predetermined comparative value. When the defocus quantity DF2 of the second island 42 is much larger than the defocus quantity DF4 of the fourth island 44, the AF-CPU 301 selects the defocus quantity DF2 of the second island 42 as a defocus quantity of the second focusing area (Step #91).

When the defocus quantity DF2 of the second island 42 is smaller than the defocus quantity DF4 of the fourth island 44, the AF-CPU 301 judges whether the defocus quantity DF4 is much larger than the defocus quantity DF2 or not (Step #83). The judgement is substantially the same as that in the step #81. When the defocus quantity DF4 of the fourth island 44 is much larger than the defocus quantity DF2 of the second island 42, the AF-CPU 301 selects the defocus quantity DF4 of the fourth island 44 as a defocus quantity of the second focusing area (Step #89).

When the defocus quantity DF4 of the fourth island 44 is smaller than the defocus quantity DF2 of the second island 42 but they are near to each other, when the defocus quantity DF2 of the second island 42 is smaller than the defocus quantity DF4 of the fourth island 44 but they are near to each other and when the defocus quantity DF4 of the fourth island 44 is equal to the defocus quantity DF2 of the second island 42, the AF-CPU 301 judges whether a reliability value RE2 showing a reliability of the second island 42 is larger than a predetermined comparative value T1 or not (Step #85). As the reliability value RE2, the smallest discordance quantity H2(k) or the contrast value CA2 of the second island 42 can be used. The same rule applies correspondingly to the following. When the reliability value RE2 of the second island 42 is larger than the predetermined comparative value Y1 (DF2>Y1), the AF-CPU 301 selects the defocus quantity DF2 of the second island 42 as a defocus quantity of the second focusing area (Step #91). In step #85, the defocus quantity DF2 of the second island 42 which is disposed in the lateral direction is preferentially selected against the defocus quantity DF4 of the fourth island 44 disposed in the longitudinal direction.

When the reliability value RE2 of the second island 42 is equal to or smaller than the predetermined comparative value Y1 (RE2≦Y1), the AF-CPU 301 judges whether the reliability value RE2 is larger than a reliability value RE4 showing the reliability of the fourth island 44 or not (Step #87). When the reliability value RE2 of the second island 42 is equal to or larger than the reliability value RE4 of the fourth island 44, the AF-CPU 301 selects the defocus quantity DF2 of the second island 42 as a defocus quantity of the second focusing area (Step #91). Alternatively, when the reliability value RE4 of the fourth island 44 is larger than the reliability value RE2 of the second island 42, the AF-CPU 301 selects the defocus quantity DF4 of the fourth island 44 as a defocus quantity of the second focusing area (Step #89).

When the defocus quantity of the second focusing area is selected, the AF-CPU 301 reads a defocus quantity DF1 of the first island 41 of the as a defocus quantity of the first focusing area and reads a defocus quantity DF3 of the third island 43 as a defocus quantity of the third focusing area from the memory 311 (Step #93). The AF-CPU 301 compares three defocus quantities of the first to third focusing areas and decides the defocus quantity of the focusing area showing the nearest object to the camera as the final defocus quantity (Step #95). When the final defocus quantity is decided, the AF-CPU 301 calculates a moving quantity of the optical lens system 201 by using the final defocus quantity and it controls the AF driving unit 160 and the lens driving mechanism 203 based on the calculated moving quantity of the optical lens system 201 (Step #97).

In step #57 of the above-mentioned flowchart shown in FIGS. 12 to 16, when the re-transmission flag is turned on with respect to any island, the charge storage is executed with respect to all the islands 41 to 44 of the sensor tip 141 in step #9. However, it is not restricted as this example. When the charge storage can independently be executed with respect to each island 41 to 44, the charge storage is executed with respect to only the island to which the re-transmission flag is turned on. Furthermore, in the steps #23 to #27, the output signals of the first to fourth islands 41 to 44 are independently amplified by alternative of the LC mode and the NM mode. However, it is possible that all the output signals of the first to fourth islands 41 to 44 are commonly amplified by alternative of the LC mode and the NM mode, and only the amplified output signals of any island to which the re-transmission is demanded are transmitted to the A/D converter 310 of the AF-CPU 301. Furthermore, in steps #35 to #57, the contrast values CAn (n=1 to 4) are calculated and the amplifying mode and the gain for the amplification are set with respect to each island. However, it is possible to calculate the contrast value or to set the amplifying mode and the gain with respect to each focusing area. Since the first and third islands 41 and 43 substantially correspond to the first and third focusing areas, one of the second island 42 and the fourth island 44 having the larger contrast value is selected and the operations are executed with reference to the output signals of the selected island with respect to the second focusing area. By such a configuration, it is possible to omit the steps #77 to #91 for selecting the defocus quantity of the second focusing area.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A detector for detecting a predetermined information from output signals of photoelectric transfer element arrays comprising:

a first photoelectric transfer element array disposed in a first direction and having a plurality of photoelectric transfer elements;

a second photoelectric transfer element array disposed in a second direction and having a plurality of photoelectric transfer elements; and a calculator calculating a first defocus quantity and a first reliability value by using output signals from the first photoelectric transfer element array and a second defocus quantity and a second reliability value by using output signals from the second photoelectric transfer element arrays, and determining a defocus quantity as a final defocus quantity in accordance with the first and second defocus quantities and the first and second reliability values.

2. The detector in accordance with claim 1, wherein the calculator selects the larger one of the first and second defocus quantities when an absolute value of a difference between the first defocus quantity and the second defocus quantity is larger than a predetermined value.

3. The detector in accordance with claim 1, wherein the calculator selects the first defocus quantity when an absolute value of a difference between the first defocus quantity and the second defocus quantity is equal to or smaller than a predetermined value and the first reliability value is larger than a predetermined value.

4. The detector in accordance with claim 1, wherein the calculator selects a defocus quantity from the first and second defocus quantities corresponding to the larger reliability value of the first and second reliability values when an absolute value of a difference between the first defocus quantity and the second defocus quantity is equal to or smaller than a predetermined value.

5. The detector in accordance with claim 1, wherein the first and second reliability values are respectively contrast values calculated by using data of pixels of the first and second photoelectric transfer element arrays.

6. The detector in accordance with claim 1, wherein the first and second reliability values are respectively values corresponding to correlation values calculated by using data of pixels of the first and second photoelectric transfer element arrays.

7. The detector in accordance with claim 1, wherein the first direction crosses at right angle with the second direction.

8. A detector for detecting a predetermined information from output signals of photoelectric transfer element arrays comprising:
   - a first photoelectric transfer element array disposed in a first direction and having a plurality of photoelectric transfer elements;
   - a second photoelectric transfer element array disposed in a second direction and having a plurality of photoelectric transfer elements; and
   - a calculator calculating a first defocus quantity and a second defocus quantity respectively by using output signals from the first and second photoelectric transfer element arrays and selecting a larger defocus quantity from the first and second defocus quantities as a final defocus quantity when an absolute value of a difference between the first defocus quantity and the second defocus quantity is larger than a predetermined value.

9. The detector in accordance with claim 8, wherein the information is a focus of an optical lens system.

* * * * *